United States Patent
Mizukami

(10) Patent No.: US 7,103,655 B2
(45) Date of Patent: Sep. 5, 2006

(54) SYSTEM FOR MANAGING INFORMATION IN NODES PROVIDED FOR NETWORK, AND NODES

(75) Inventor: Takashi Mizukami, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 871 days.

(21) Appl. No.: 09/988,796

(22) Filed: Nov. 20, 2001

(65) Prior Publication Data

US 2002/0120708 A1    Aug. 29, 2002

(30) Foreign Application Priority Data

Feb. 28, 2001    (JP) .............................. 2001-053630

(51) Int. Cl.
*G06F 15/167* (2006.01)
*G06F 15/173* (2006.01)
*G06F 15/16* (2006.01)

(52) U.S. Cl. .................. 709/223; 709/216; 709/224; 709/248

(58) Field of Classification Search ................ 709/223, 709/228, 243, 216, 224, 248
See application file for complete search history.

(56) References Cited

U.S. PATENT DOCUMENTS

| | | | |
|---|---|---|---|
| 6,438,707 B1 * | 8/2002 | Ronstrom | 714/13 |
| 6,502,131 B1 * | 12/2002 | Vaid et al. | 709/224 |
| 6,594,786 B1 * | 7/2003 | Connelly et al. | 714/50 |
| 6,671,737 B1 * | 12/2003 | Snowdon et al. | 709/243 |

FOREIGN PATENT DOCUMENTS

JP    A-2000-047961    2/2000

OTHER PUBLICATIONS

"Network Management Method with Active Network Technology," Suzuki et al., *Shingaku Giho*, vol. 100, No. 178 (Report by The Institute of Electronics Information and Communication Engineers of Japan), Jul. 14, 2000.

* cited by examiner

*Primary Examiner*—Saleh Najjar
*Assistant Examiner*—Benjamin R. Bruckart
(74) *Attorney, Agent, or Firm*—Rabin & Berdo, P.C.

(57) ABSTRACT

A node information management system including a plurality of nodes (1*i*) connected through a network and an information collecting apparatus (10) connected to the nodes so as to collect predetermined information regarding each node. Each node has: a memory unit (122) which stores the predetermined information formed by the node itself every formation of the information; a transmitting unit (120) which supplies the predetermined information stored in the node information memory unit of the node itself to another node; and a backup memory unit (123) which stores the predetermined information supplied from the node information transmitting unit of such another node. The node information is hardly lost and a load of a collecting process of the node information collecting apparatus is reduced.

11 Claims, 17 Drawing Sheets

Fig. 3

| Node information | | | | | | Charge information | |
|---|---|---|---|---|---|---|---|
| Obtaining node | The number of hopping times | The number of connected nodes | Date/ time | Traffic amount | Rate of packet loss | packet delay | |
| | | | | | | | User A | User B |
| | | | | | | | | |

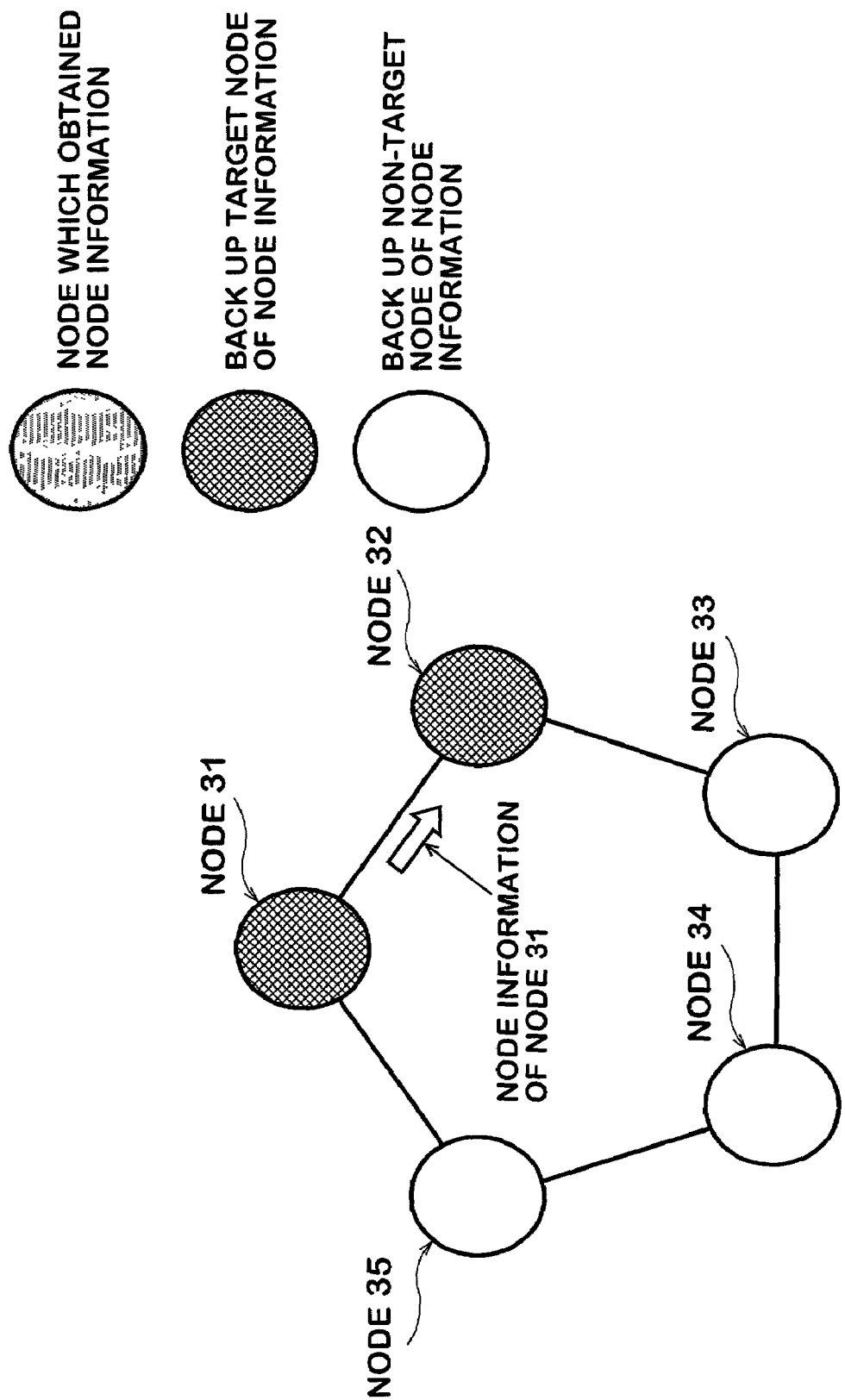

SYSTEM FOR MANAGING INFORMATION IN NODES PROVIDED FOR NETWORK, AND NODES

BACKGROUND OF THE INVENTION

1. Field of the Invention

The invention relates to a node information management system and nodes which are suitable for various networks as well as a packet exchange network.

2. Related Background Art

A collecting method of node information in a conventional packet exchange network will be described.

Generally, nodes such as exchanges, routers, or the like and a monitoring apparatus for managing them are included in a network.

In order to monitor communication quality information such as delay of a packet, loss of the packet, traffic amount, band, and the like, setting information in nodes such as a transfer processing method of a routine table provided every node or the packet, and the like, and information regarding the user such as connecting time of each user, charging, and the like, etc., each node has a function for obtaining those information and managing them by a memory device of each node. In the following description, those communication quality information, node setting information, and information regarding the user are called node information.

As such a monitoring apparatus provided for the network, there is an apparatus called NMS (Network Management Station) for managing the node information. The NMS collects the node information by communication with each node by using a protocol such as SNMP (Simple Network Management Protocol), ICMP (Internet Control Message Protocol), or the like.

AS a node information collecting method of the NMS, for example, there are a polling method/trapping method using the SNMP and an active program method. The polling method and the trapping method have been disclosed in the prior art of the following literature 1. The active program method has been disclosed in the following literature 2 as a network management system using an active network technique.

Literature 1: JP-A-2000-047961

Literature 2: Suzuki et al., "Network Management Method with Active Network Technology", The Institute of Electronics Information and Communication Engineers of Japan, Singaku Giho, Vol. 100, No. 178, Jul. 14, 2000.

The polling method is a method of starting the collection of the node information at an opportunity of the NMS itself. According to the trapping method, when a state of the node is changed, the node transmits a signal of an event opportunity called a trap to the NMS, thereby allowing the NMS to collect the node information.

The active program method has a feature such that a packet called a programmable packet circulates through each node. A program for a process to be instructed from the NMS to the node has been inserted in the programmable packet. When the programmable packet is received, each node executes the program. The programmable packet circulates through each node and brings back a program execution result of each node to the NMS.

In case of collecting the node information by the trapping method, there are the following problems. For example, if the trap cannot be transmitted to the NMS because a failure occurred in the node, the NMS is not able to know the failure or state of the node. Therefore, the polling method and active program method is generally and widely used.

However, the polling method and active program method also have the following problems. In the polling method, each node has to hold the node information for a period of time from timing when the node information is collected by the NMS to timing when the next node information is collected. Therefore, when a failure occurs in the node, the node information held in the node can be lost. In a manner similar to the above, also in the active program method, when a failure occurs in the node, the node information held in the node can be lost.

To avoid such problems, in the polling method and active program method, there is a method whereby the NMS executes the collection of the node information at a short period.

In such a case, however, the following new problems occur. In the polling method of collecting the node information at a short period, if the NMS manages many nodes, a processing load of the NMS increases. If a collecting period of the node information of the NMS is shortened in a network of a large scale, a load on the NMS further increases and it is difficult to collect the node information. Also in the active program method, similarly, when a node information collecting period in the network of a large scale is shortened, a load on the NMS increases.

OBJECTS AND SUMMARY OF THE INVENTION

It is, therefore, an object of the invention to provide a node information management system and nodes, in which a possibility that node information is lost can be reduced even if a failure occurs in a node, and a load of the collection of the node information of a monitoring apparatus such as an NMS mentioned above can be also reduced.

According to the first aspect of the invention, the above object is accomplished by a node information management system including a plurality of nodes each of which is connected through a network so that they can communicate with each other and a node information collecting apparatus connected to each of the nodes so that it can communicate therewith in order to collect predetermined information regarding each of the plurality of nodes, wherein each node comprises: a node information memory unit which stores the predetermined information regarding the node itself which was formed by the node itself every formation of the predetermined information; a node information transmitting unit which supplies the predetermined information stored in the node information memory unit of the node itself to another node connected adjacently to the node itself through the network; and a backup node information memory unit which stores the predetermined information supplied from the node information transmitting unit of such another node as backup information.

For example, the node information collecting apparatus collects the predetermined information stored in the node information memory unit of each node from each node. With respect to the node from which the predetermined information cannot be collected, the node information collecting apparatus can collect the predetermined information stored in the backup node information memory unit of such another node adjacent to the relevant node.

For example, the node information transmitting unit of each node can supply the predetermined information regarding another node stored in the backup node information memory unit of the node itself to other nodes excluding such another node so as to be stored into the backup node information memory units of the other nodes.

In this case, for example, the node information collecting apparatus collects the predetermined information stored in the node information memory unit of each node from each node. With respect to the node from which the predetermined information cannot be collected, the node information collecting apparatus can collect the predetermined information stored in the backup node information memory unit of such another node except for the relevant node.

For example, the node information collecting apparatus collects the predetermined information stored in the node information memory unit of each node and the predetermined information stored in the backup node information memory unit from each node.

When there is a loss in the predetermined information stored in the node information memory unit of each node, for example, the node information collecting apparatus can compensate the information with the loss of the node with the predetermined information stored in the backup node information memory unit of another node, thereby enabling the node information of each node to be formed.

The node information management system is, for example, a node information collection system.

For example, the node information memory unit and the backup node information memory unit provided for each node can be constructed by a single memory device.

For example, each node further has a node information forming unit which forms the predetermined information regarding the node itself.

For example, the node information collecting apparatus can have a node information collecting unit which collects the predetermined information stored in the node information memory unit of each node and the predetermined information stored in the backup node information memory unit.

For example, the node information collecting apparatus can periodically collect the information from each node on the basis of a polling signal from the apparatus by a polling method by which the apparatus communicates with each node at a predetermined period.

For example, the node information collecting apparatus can periodically collect the information by an active program method by which a predetermined packet signal which is periodically transmitted from the apparatus to the network, that is, a predetermined packet signal which circulates through each node in the network is received.

The predetermined information regarding each node can be constructed by, for example, information including communication quality information of the node, node setting information, and information regarding the user.

The communication quality information can be constructed by, for example, information including: packet delay information showing a mean time which is required for each packet process in the node in every predetermined unit time; packet loss information showing the number of lost packets in the node in every predetermined unit time; and traffic information showing a packet inflow amount to the node in every predetermined unit time.

The node setting information can be constructed by, for example, information including: routing information showing a transfer route of the packet to be transferred; and transfer information showing a transfer method of the packet.

The user information can be constructed by, for example, information including: connecting time information in which a time during which the user who communicates through each node is connected to the node for the purpose of communication is shown every user; and charge information showing a communication fee which is charged for every user.

According to the second aspect of the invention, there is provided a node as one of a plurality of nodes each of which is connected through a network so that they can communicate with each other and in which predetermined information regarding such a node is collected by a node information collecting apparatus connected to the node so that it can communicate therewith, comprising: a node information memory unit which stores the predetermined information regarding the node itself which was formed by the node itself every formation of the predetermined information; a node information transmitting unit which supplies the predetermined information stored in the node information memory unit of the node itself to another node connected to the node itself through the network; and a backup node information memory unit which stores the predetermined information supplied from the node information transmitting unit of such another node as backup information.

For example, the node can further comprise a node information forming unit which forms the predetermined information regarding the node itself.

When the predetermined information which was newly supplied from the node information transmitting unit of such another node cannot be stored into the backup node information memory unit of the node itself, in order to assure an area for storing such information into the backup node information memory unit, the node can delete the predetermined information which has already been transferred through the plurality of other nodes and stored in the backup node information memory unit, that is, the predetermined information which has been transferred via a larger number of nodes than the number of nodes through which the newly supplied predetermined information has been transferred.

The above and other objects and features of the present invention will become apparent from the following detailed description and the appended claims with reference to the accompanying drawings.

BRIEF DESCRIPTION OF THE DRAWINGS

FIG. 3 is an explanatory diagram of node information in the first embodiment;

FIG. 20 is an explanatory diagram of backup nodes of node information in the third embodiment.

DETAILED DESCRIPTION OF THE PREFERRED EMBODIMENTS

(A) First Embodiment

The first embodiment of a node information management system and nodes according to the invention will now be described hereinbelow with reference to the drawings.

(A-1) Construction of the First Embodiment

Figure 2:
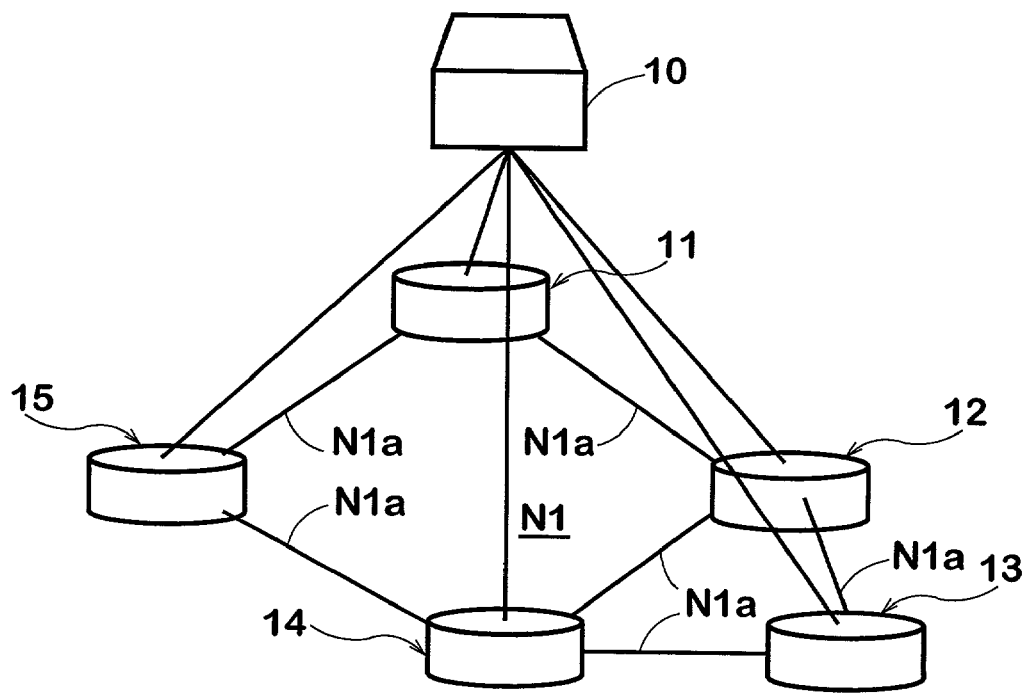
FIG. 2 is a block diagram showing a construction of a network in the first embodiment.

FIG. 2 is a block diagram showing a construction of a packet exchange network according to the first embodiment. In FIG. 2, a network N1 has: a plurality of nodes which are properly connected through a link N1*a* serving as a transmission path of the network; and an NMS 10 serving as a monitoring apparatus for integratedly managing information which is handled by each node. In an example shown in the diagram, five nodes 11 to 15 are connected to the network N1.

Each of the nodes 11 to 15 properly obtains and forms node information as shown in, for example, FIG. 3.

In the first embodiment, as will be explained hereinbelow, the node information is not only held in the node which obtained and formed this node information but also held as backup node information into the node adjacent to the node which obtained the node information. Hereinafter, such an adjacent node is called a backup node. The operation for obtaining and forming the node information includes not only the making of new node information but also the updating of the node information.

As shown in FIG. 3, the node information is constructed by the following elements: that is, an obtaining node; the number of hopping times; the number of connected nodes; date/time; a traffic amount; a rate of packet loss; a packet delay; charge information; and the like.

In the node, information mentioned above, the obtaining node is specific information, such as an IP address, regarding the node which obtained the node information. The number of hopping times shows the number of links N1*a* which reach the backup nodes. The number of hopping times has an initial value "0" and is incremented by "1" each time the node information is moved to the backup node. The number of hopping times functions effectively in the second embodiment, which will be explained hereinlater. The number of connected nodes denotes the number of nodes connected to the node which obtained the node information. In the example shown in FIG. 2, for instance, assuming that the node which obtained the node information is the node 11, the nodes connected to the node 11 are the nodes 12 and 15.

Therefore, the number of connected nodes is equal to 2. The date/time denotes date/time when the node information was obtained. The traffic amount denotes an inflow amount of the packets to the obtaining node on a unit basis of a predetermined time (for example, 100 msec). The rate of packet loss denotes the number of lost packets in the obtaining node on a unit basis of a predetermined time (for example, 100 msec). The packet delay indicates a mean processing time of each packet in the obtaining node on a unit basis of a predetermined time (for example, 100 msec). The charge information shows use fees per user and indicates the sum of use fees of the packets used by the user of a unit of a predetermined time (for example, 100 msec).

Figure 1:
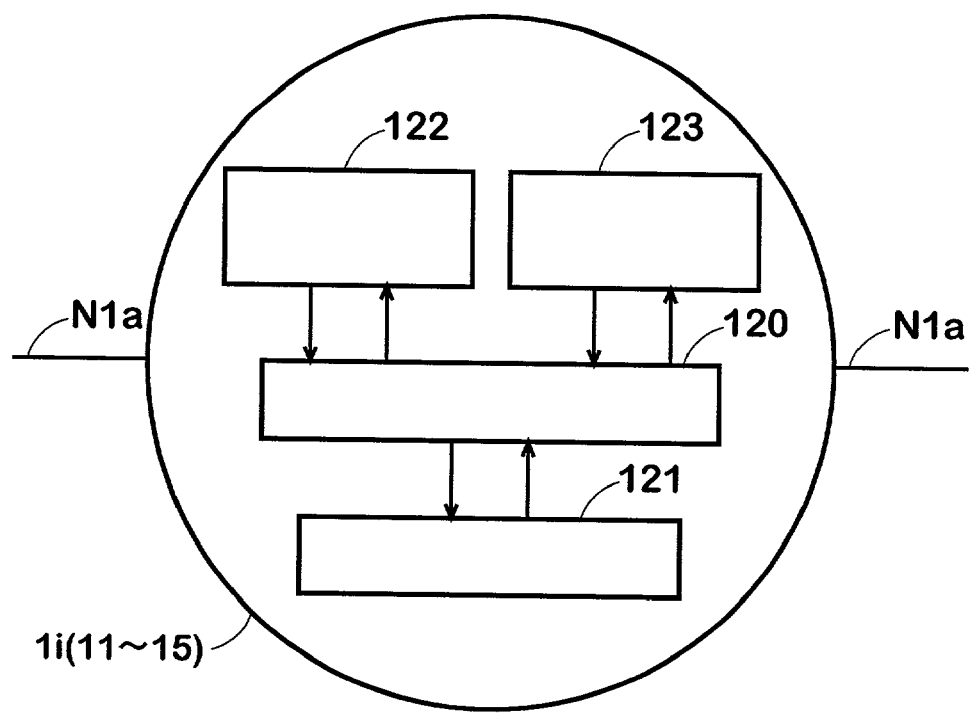
FIG. 1 is a block diagram showing a construction of a node according to the first embodiment.

FIG. 1 is a block diagram showing a functional construction related to the node information of each of the nodes 11 to 15.

In FIG. 1, each node 1*i* (1*i* denotes one of 11 to 15) has: a node information managing unit 120; a node information forming unit 121; a memory device unit 122; and an adjacent node information memory device unit 123.

The node information managing unit 120 serving as a node information transmitting unit executes; a storing process of the node information obtained and formed by the node information forming unit 121 and the node information transferred from another node; a transferring process of the node information to the backup nodes or the NMS 10; and the like.

The node information forming unit 121 monitors the traffic amount of the node 1*i*, the rate of packet loss, the delay of the packet, the charge information per user, and the like, properly forms the node information, and supplies the node information to the node information managing unit 120 every making of the node information.

The memory device unit 122 operates under the control of the node information managing unit 120 and holds the node information regarding the node 1*i*.

The adjacent node information memory device unit 123 operates under the control of the node information managing unit 120 and holds the node information supplied from the adjacent node to be backed up by the node 1*i*.

Figure 4:
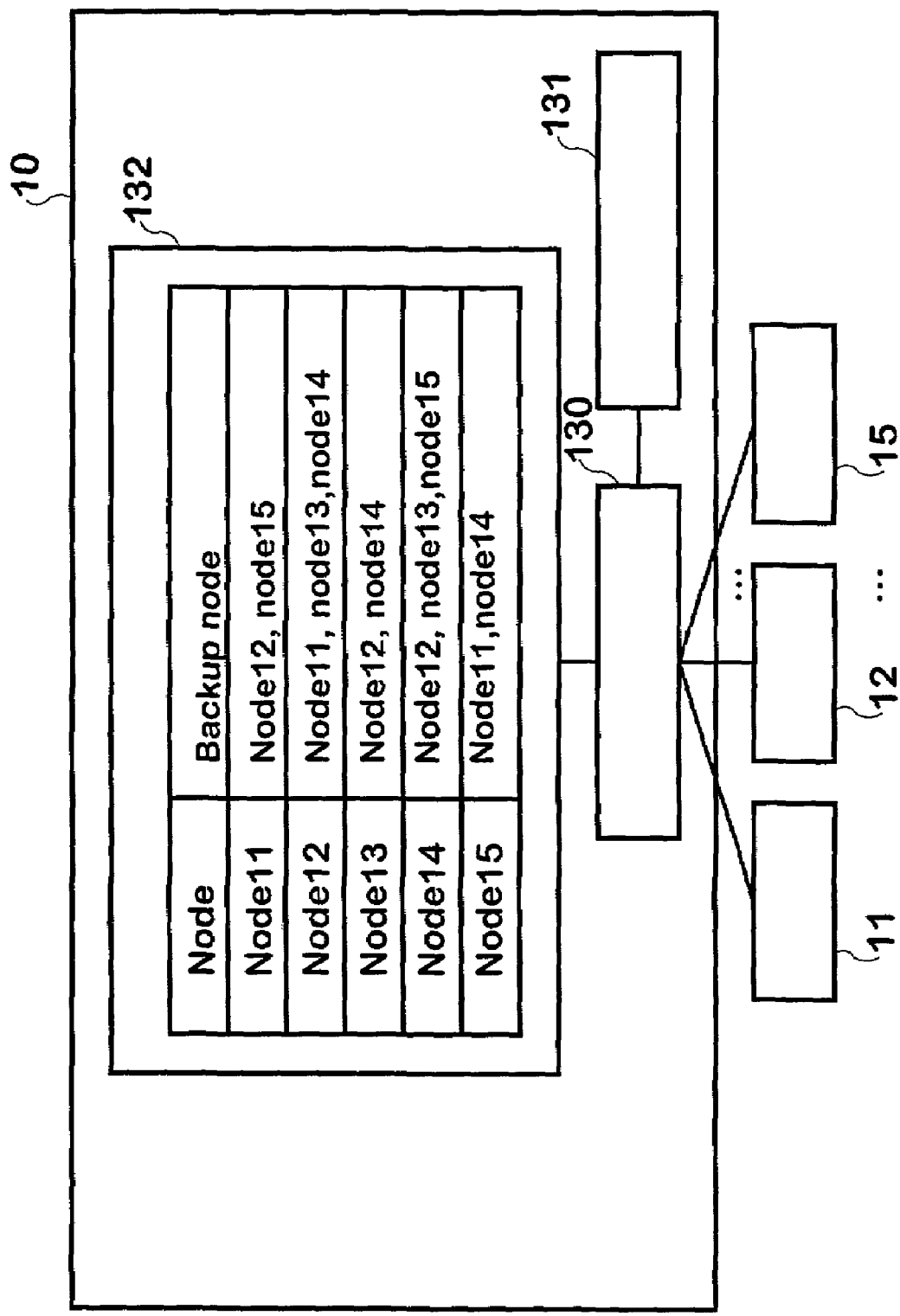
FIG. 4 is a block diagram showing a construction of an NMS in the first embodiment.

FIG. 4 is a block diagram showing a functional construction of the NMS 10 having the collecting function of the node information.

In FIG. 4, the NMS 10 has a node information collecting unit 130 and a node information storing apparatus 131. A backup node management table 132 is provided for the node information collecting unit 130.

The node information collecting unit 130 collects the node information from the nodes 11 to 15. In the embodiment, the polling method using the SNMP (a polling period is equal to T msec) is used.

The node information storing apparatus 131 is a memory device for storing the node information collected by the node information collecting unit 130. It is desirable that this memory device has a large capacity because the node information of each node is stored. In order to prevent the loss of node information which is held in the node information storing apparatus 131, a restriction against an access to the node information storing apparatus 131 from the outside can be provided for the NMS 10.

The node information which is held in the node information storing apparatus 131 can be supplied to, for example, an administrator or the like of the NMS 10 as necessary. For instance, when the charge information regarding a certain user is requested by the administrator, the NMS 10 searches the corresponding charge information from the node information storing apparatus 131 and supplies the searched information to the administrator.

The backup node management table 132 is an information table in which information for allowing the node which obtained and formed the node information and the backup nodes which back up and hold the node information to be concerned with each other has been stored. Specific information (for example, IP address) of the node which obtained and formed the node information and specific information of the backup nodes of the obtaining node have been stored in the table 132. As shown in an example of FIG. 4, assuming that all of the nodes adjacent to the node which obtained and formed the node information are the backup nodes, in place of providing the backup node management table 132, construction information showing the connecting relation between each node in the network N1 stored by the NMS 10 and the link N1*a* can be also applied.

(A-2) Operation of the First Embodiment

The operation regarding the handling of the node information with respect to of the node information management system and the nodes in the first embodiment will now be described with reference to the drawings.

The operation in the node 1*i*, particularly, the operation in the node information managing unit 120 of the relevant node will be described with reference to a flowchart of FIG. 5.

When an activation is instructed, the node information managing unit 120 discriminates whether its own end has been instructed or not, that is, whether the end of a process other than the activating process mentioned above has been instructed or not (step S1). If the end is instructed (YES in step S1), the unit 120 enters a mode of accepting only the activating instruction without executing a backup process or the like, which will be explained hereinlater. For example, if the node is executing a shut-down process, it is regarded that the end has been instructed.

If the end is not instructed (NO in step S1), the node information managing unit 120 waits for the node information which is supplied from the node information forming unit 121 or the node information which is supplied from the adjacent node (steps S2, S3).

When the new node information formed by the node information forming unit 121 is supplied therefrom, the node information managing unit 120 sends the node information to the memory device unit 122 and stores it therein (step S4). The node information managing unit 120 transmits the node information of the node itself as backup node information to all of the adjacent nodes connected to the node itself through the link N1*a* (step S5). After that, the node information managing unit 120 is returned to a wait reception mode of the new node information which is supplied from the node information forming unit 121 or the backup node information which is supplied from the adjacent node.

The transmission of the node information to all of the adjacent nodes in step S5 mentioned above can be sequentially performed, for example, in every preset time.

When the node information as backup node information is supplied from the adjacent nodes, the node information managing unit 120 sends the node information to the adjacent node information memory device unit 123 and stores it therein (step S6). After that, the node information managing unit 120 is returned to a wait reception mode of the new node information which is supplied from the node information forming unit 121 or the backup node information which is supplied from the adjacent node.

Figure 5:
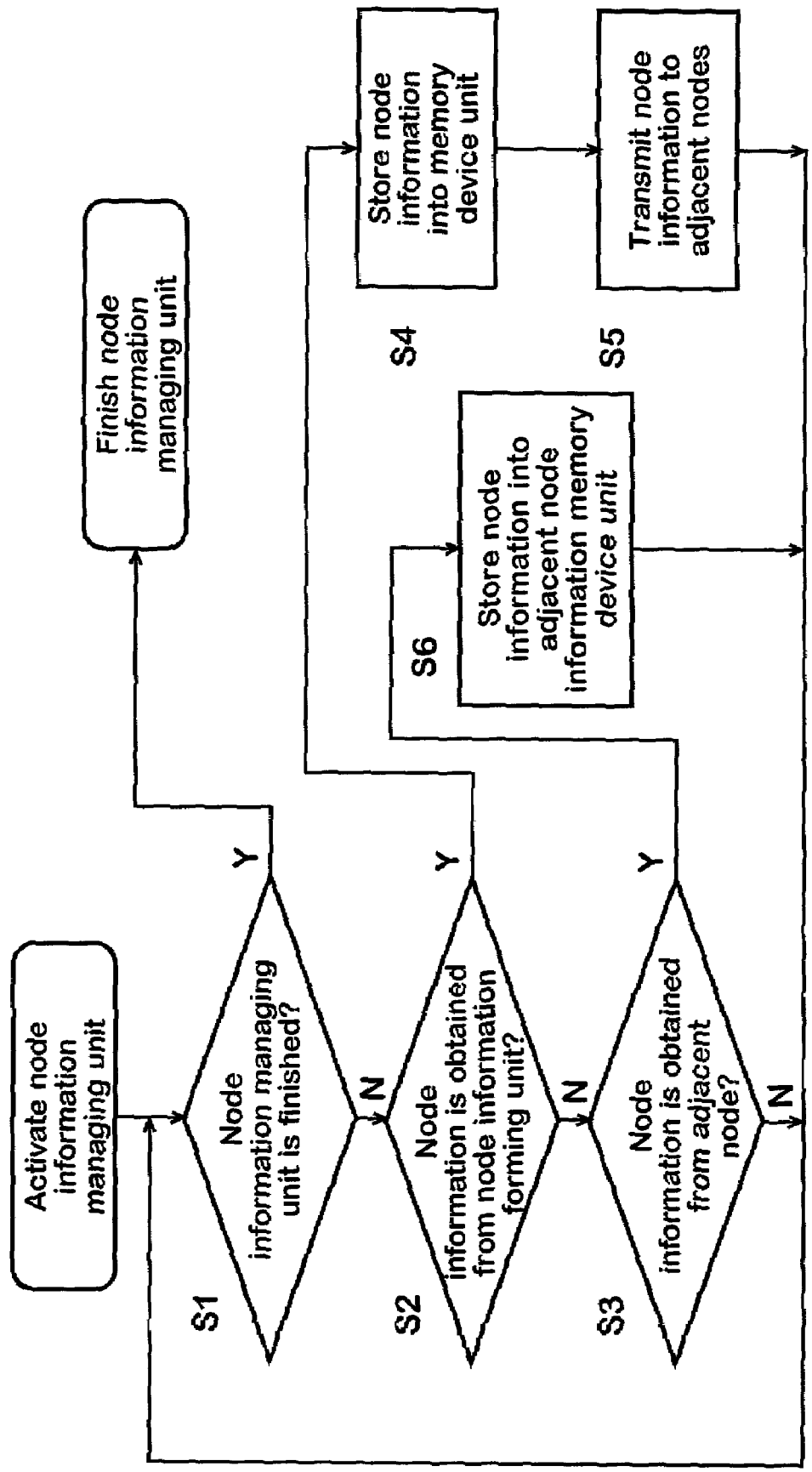
FIG. 5 is a flowchart showing processes in the node in the first embodiment.

Although not shown in the flowchart shown in FIG. 5, when a collecting instruction of the node information is issued from the NMS 10, that is, when an instruction to supply the node information is sent to the NMS 10, the node information managing unit 120 transmits the node information held in the memory device unit 122 to the NMS 10. When the collecting instruction of the node information of the adjacent nodes is inputted from the NMS 10, the node information managing unit 120 transmits the node information of the instructed adjacent nodes stored in the adjacent node information memory device unit 123 to the NMS 10.

Figure 6:
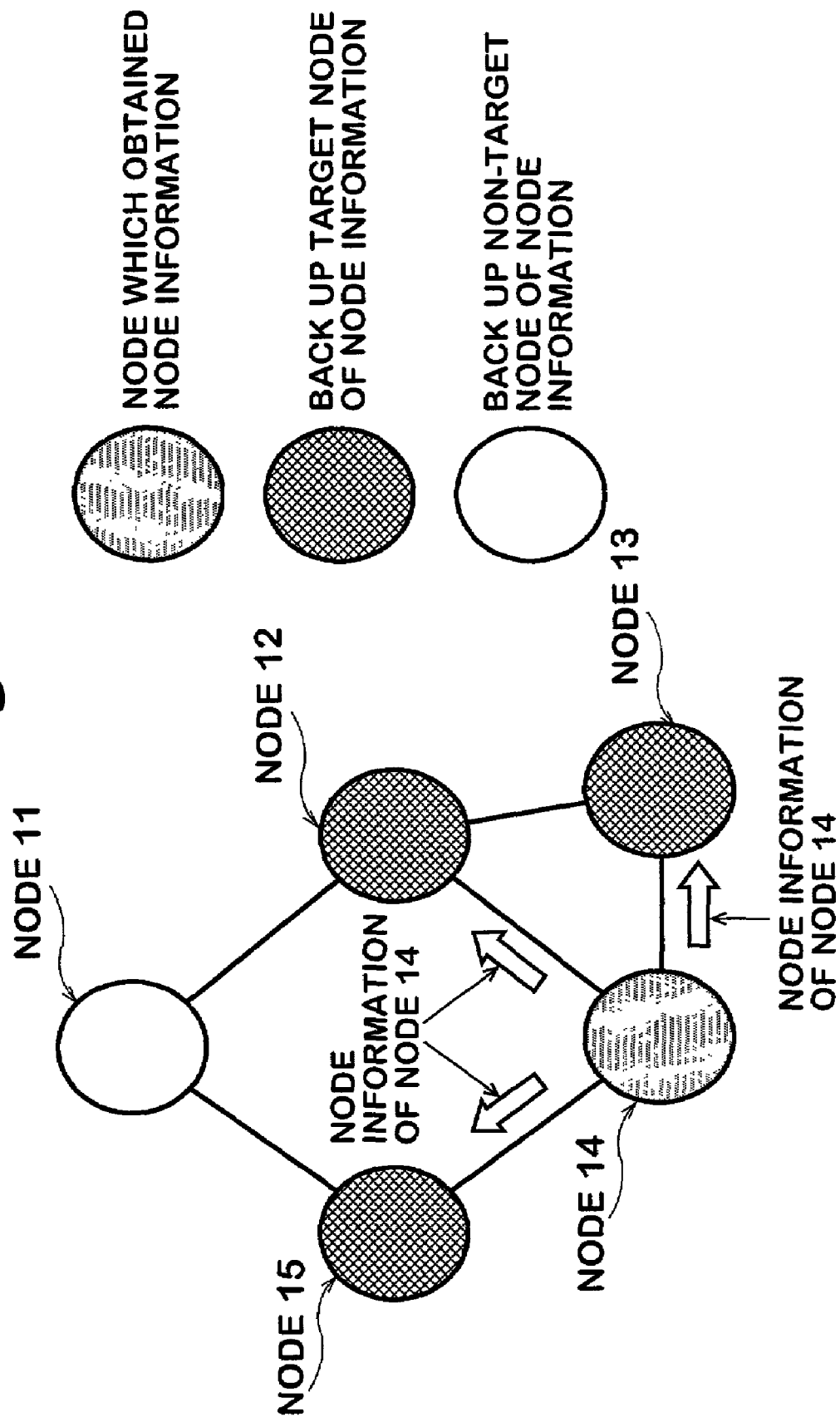
FIG. 6 is an explanatory diagram of backup nodes of the node information in the first embodiment.

FIG. 6 is an explanatory diagram showing a procedure by which the node information obtained (formed) by the node information forming unit 121 of the node 14 is stored as a backup in the adjacent nodes as an example of the backup storage.

As shown in FIG. 2, in the network N1 of the embodiment, since the nodes 12, 13, and 15 are adjacent to the node 14 through the link N1*a*, the node information of the node 14 is transmitted to the adjacent nodes 12, 13, and 15 in a manner similar to the process in step S5 mentioned above. Further, as described in step S6 mentioned above, each of the adjacent nodes 12, 13, and 15 stores the node information of the node 14 into its own adjacent node information memory device unit 123. As mentioned above, the node information of the node 14 is stored into not only the node 14 but also the adjacent nodes.

Since the node 11 is not adjacent to the node 14, in other words, since the node 11 and node 14 are not directly connected through the link N1*a*, the node information of the node 14 is not transferred to the node 11. Therefore, as shown in FIG. 6, the node 11 becomes the backup non-target node regarding the node 14.

Figure 7:
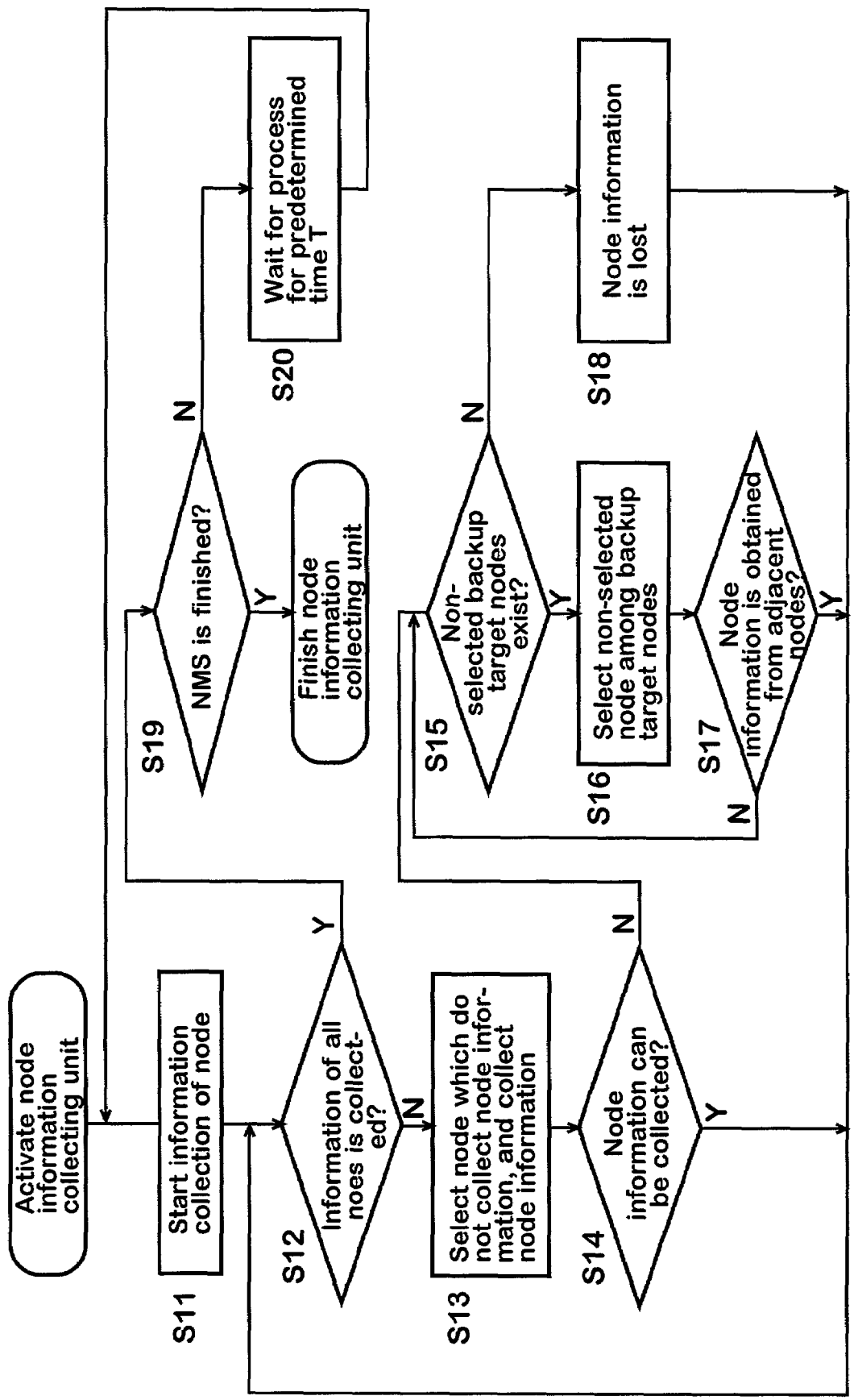
FIG. 7 is a flowchart showing a collecting process of the NMS in the first embodiment.

The node information collecting process which is executed by the node information collecting unit 130 of the NMS with respect to the NMS 10 will now be described with reference to a flowchart of FIG. 7.

When the node information collecting unit 130 of the NMS 10 is activated, it starts the node information collecting process and executes a predetermined initial setting such as setting of proper parameters or the like (step S11).

After that, while the node information collecting unit 130 confirms whether the node information obtained and formed by the nodes has been collected or not with respect to all of the nodes on the network N1 (step S12), the unit 130 repeats the collection of the node information every node until the end of the confirmation about all of the nodes (steps S13 to S18).

In the node information collecting process, the node information collecting unit 130 first selects one node to which the collection of the node information is not activated yet and allows this node to transmit the node information to the NMS 10 (step S13). After that, whether the node information could be collected or not is discriminated (step S14). The node to which the transmission of the node information has been instructed in step S13 mentioned above transmits the node information of the node itself stored in the memory device unit 122. Upon collection of the node information, for example, the SNMP can be used. In the node information collecting unit 130 of the NMP 10, as mentioned above, the collected node information is stored into the node information storing apparatus 131.

If the node information can be collected (YES in step S14), the node information collecting unit 130 is returned to step S12 mentioned above and returned to the process for confirming whether the node information of the node has been collected or not with respect to all of the nodes.

If the node information cannot be collected from the node due to inconvenience or the like of the node from which the node information should be collected (NO in step S14), the node information collecting unit 130 determines that abnormality occurred in the node. The processing routine advances to a recovery process for collecting the node information from the backup nodes adjacent to such a node (steps S15 to S18).

In the recovery process, the node information collecting unit 130 discriminates whether the nodes from which the relevant backup information is not collected by the collecting unit 130 yet exist among the backup nodes for the node in which the inconvenience occurred or not (step S15). In the node information collecting unit 130, the recognition regarding which node is the backup node is made on the basis of the storage contents in the backup node management table 132.

If it is determined in step S15 that the backup nodes in which the collection of the backup node information is not tried yet exist, the node information collecting unit 130 selects one of them and instructs the selected backup node to transmit the backup node information corresponding to the collection target node, that is, the node having the inconvenience (step S16). If the backup node information of the designated node has been stored in its own adjacent node information memory device unit 123, the node information managing unit 120 of the backup node (adjacent node) which was instructed to transmit the backup node information transmits the backup node information to the NMS 10. After that, the node information collecting unit 130 of the NMS 10 discriminates whether the backup node information could be collected or not (step S17).

If the backup node information cannot be collected from the backup target adjacent node in step S17, the processing routine is returned to step S15 mentioned above.

The node information collecting unit 130 repeats the foregoing processes in steps S15 to S17. If the backup node information of the relevant node could be collected from one of the backup nodes, the processing routine is returned to step S12 mentioned above and whether the node information of the node has been collected or not is discriminated with respect to all of the nodes. If the backup node information could be collected as mentioned above, information showing that a failure occurred in the node from which the node information should inherently be collected, information showing that the node information of such a node was collected from the backup node, and the like are stored into the node information storing apparatus 131 together with the backup information.

Even if the node information collecting unit 130 intends to collect the backup node information from all of the backup nodes, when it cannot be collected (NO in step S15), information showing the fact that the node information of the node which is the collection target at that time point, that is, the node selected in step S13 has been lost is stored into the node information storing apparatus 131 (step S18). The processing routine is returned to step S12 mentioned above. In the discrimination about whether the node information could be collected from all of the nodes or not in step S12 mentioned above, even if the information indicative of the loss of the node information is obtained, the discrimination result of YES showing that the node information could be collected is obtained.

The node information collecting unit 130 of the NMS 10 repeats the above processes. If the node information including the backup node information could be collected with respect to each of all of the nodes or when the loss of the node information is recognized (YES in step S12), whether the NMS 10 has been made inactivated (finished) or not is discriminated (step S19). That is, whether the NMS 10 has executed the shut-down process or not is discriminated.

If it is not inactivated, the node information collecting unit 130 allows a preset timer to execute a counting process of a predetermined time T which specifies a start time point of the next polling collection (step S20). When the counting of the predetermined time T is finished, the processing routine is returned to step S11 mentioned above, thereby allowing the collection of the node information to be restarted.

If the NMS 10 has been inactivated, the node information collecting unit 130 finishes the processes.

(A-3) Effects of the First Embodiment

According to the node information management system and the nodes in the first embodiment of the invention, the following effects are obtained.

Since the node information of each node has been held as backup information in the adjacent nodes, even if a failure occurred in the node which obtained and formed the node information and the node information of the node cannot be read out, the node information collecting unit 130 executes the recovery process (steps S15 and S16 in FIG. 7), thereby enabling the NMS 10 to collect the node information.

Since a failure resistance is improved in terms of the management of the node information, a polling time interval (predetermined time T in step S20 in FIG. 7) of the collection of the node information of the NMS 10 can be extended, so that a processing load of the NMS 10 can be reduced.

Further, since the node whose node information should be backed up is the adjacent node directly connected through the link N1a, the traffic amount which is used for backup of the node information can be suppressed as much as possible.

The node information management system and the nodes in the first embodiment can be also applied to any network construction such as mesh-shaped construction, ring-shaped construction, bus-shaped construction, or the like, can easily cope with addition or deletion of the nodes, and have excellent flexibility.

(B) Second Embodiment

The second embodiment of a node information management system and nodes according to the invention will now be described with reference to the drawings.

In the foregoing first embodiment, the obtained and formed node information has been backed up into the adjacent nodes. In the second embodiment, the backup is executed by all of the nodes excluding the node which obtained and formed the node information.

(B-1) Construction of the Second Embodiment

Figure 8:
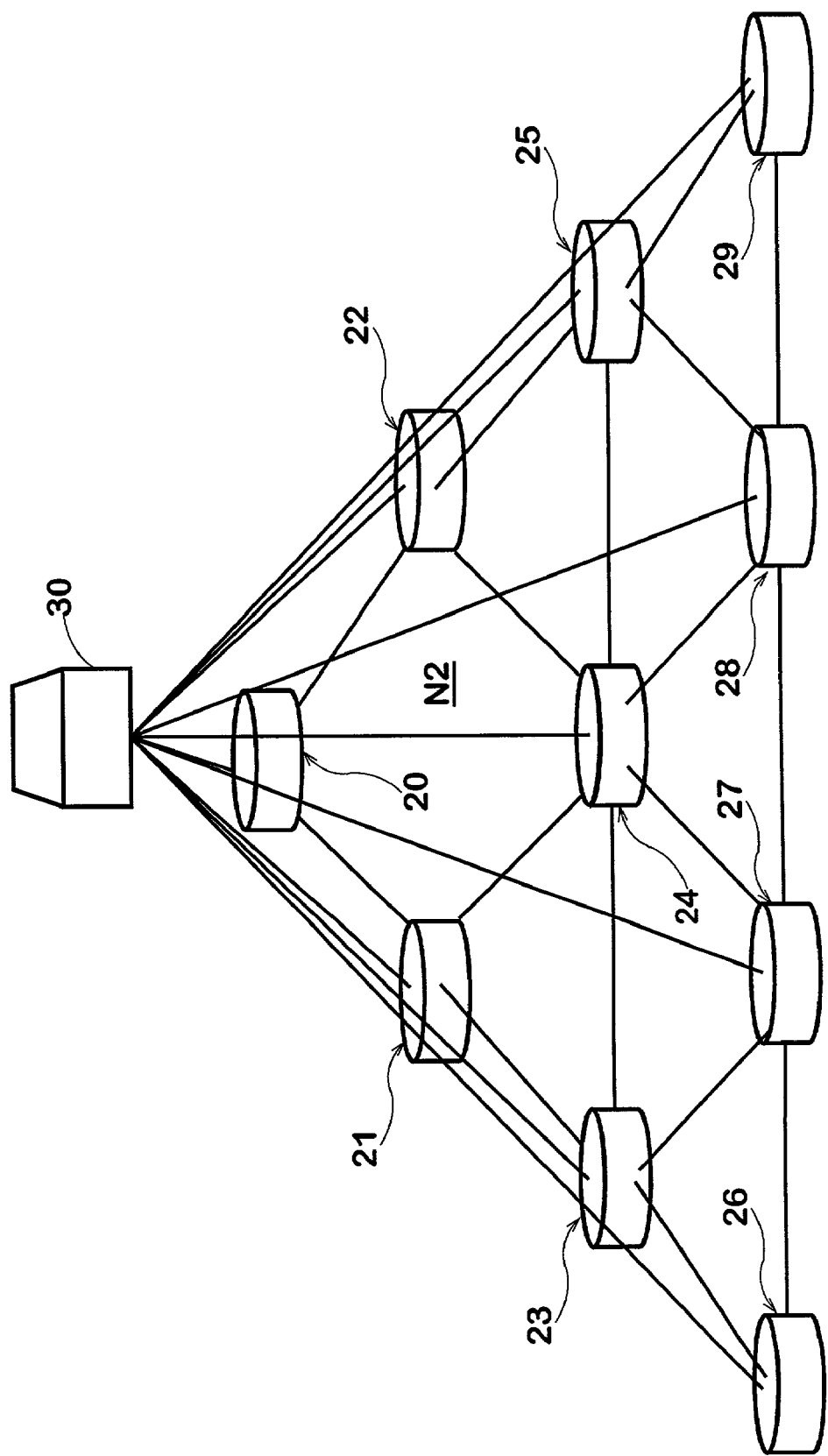
FIG. 8 is a block diagram showing a construction of a network according to the second embodiment.

FIG. 8 is a block diagram showing a construction of a packet exchange network of the second embodiment according to the invention. In FIG. 8, a network N2 has: a plurality of nodes 20 to 29 properly connected through a link N2a; and an NMS 30 serving as a monitoring apparatus. In the example shown in the diagram, the ten nodes 20 to 29 are connected to the network N2.

In the second embodiment, the construction described in conjunction with FIG. 3 can be used as a construction of node information which is obtained by each of the nodes 20 to 29. In the second embodiment, "the number of hopping times" as a component element is effectively used.

Figure 9:
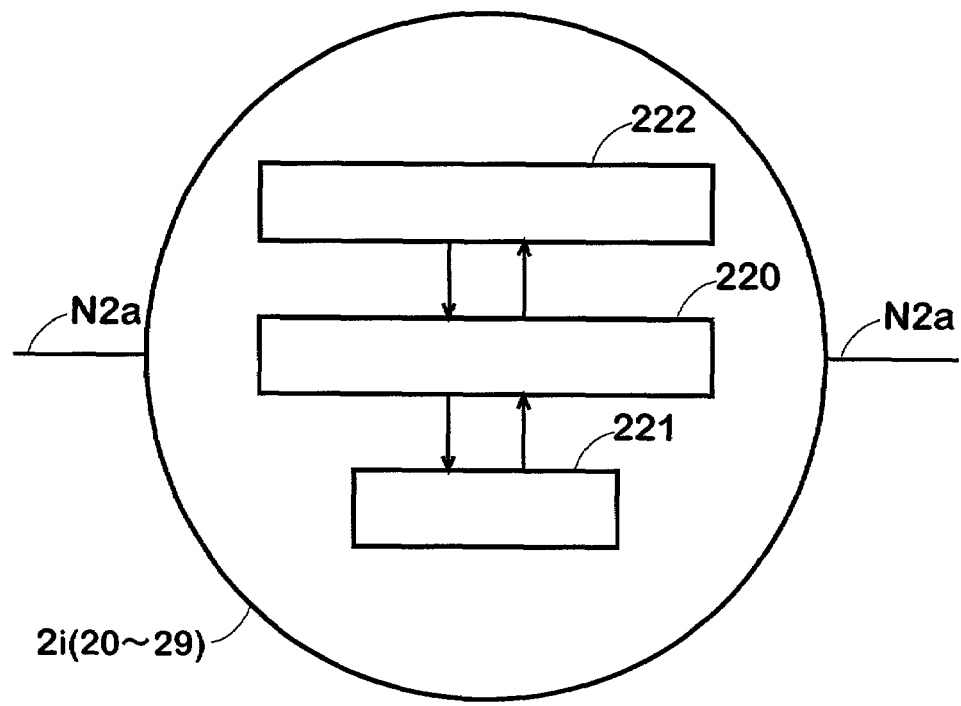
FIG. 9 is a block diagram showing a construction of a node in the second embodiment.

FIG. 9 is a block diagram showing a functional construction of a main section of each of the nodes 20 to 29 in the second embodiment.

In FIG. 9, each node 2*i* (2*i* is one of 20 to 29) has a node information managing unit 220, a node information forming unit 221, and a memory device unit 222.

The node information managing unit 220 obtains node information from the node information forming unit 221 and executes backup management or the like of the node information.

While monitoring a traffic amount of the nodes, a rate of packet loss, a delay of the packet, charge information per user, and the like, the node information forming unit 221 properly forms the node information and sends the formed node information to the node information managing unit 220.

The memory device unit 222 stores the node information obtained and formed by the node itself and the other nodes. In a manner similar to the foregoing first embodiment, the memory device unit 222 can be also separated into a memory area for the node information obtained by the node itself and a memory area for the node information obtained by the other nodes. Both of those memory areas can be also united. In the second embodiment, the memory areas in which the node information of the node itself and the other nodes are realized by one memory device unit 222.

Figure 10:
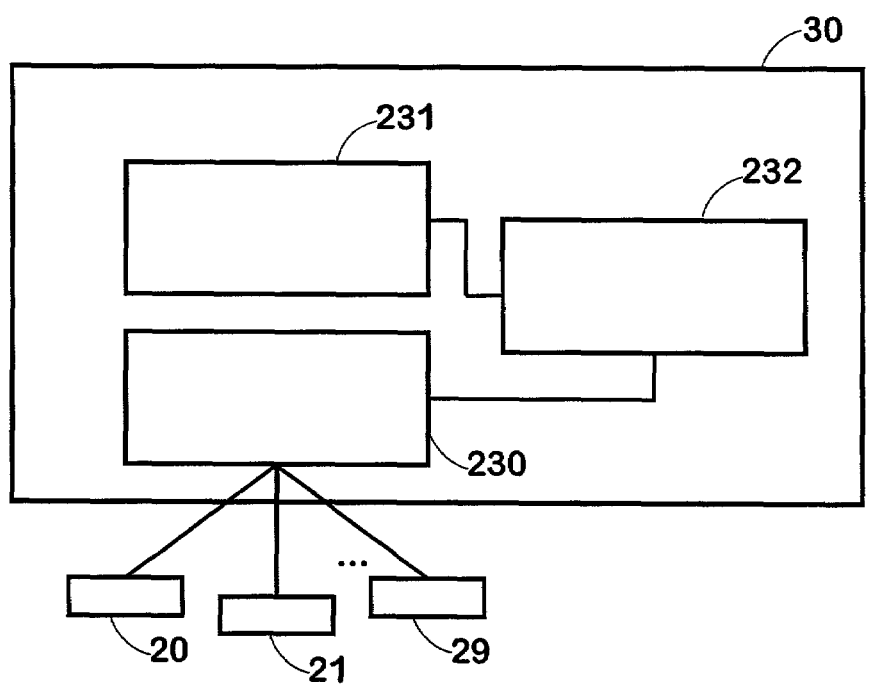
FIG. 10 is a block diagram showing a construction of an NMS in the second embodiment.

FIG. 10 is a block diagram showing a functional construction of the NMS 30 in the second embodiment having the collecting function of the node information.

As shown in FIG. 10, the NMS 30 has a node information collecting unit 230, a node information storing apparatus 231, and a node information comparing function unit 232.

The node information collecting unit 230 collects the node information of each node in a manner similar to the node information collecting unit 130 in the first embodiment. That is, the collecting unit 230 collects the node information by using the SNMP in accordance with the polling method which is activated at every period T.

The node information storing apparatus 231 is an apparatus for storing the collected node information and is constructed by, for example, a memory device of a large capacity.

The node information comparing function unit 232 compares elements included in the node information just after the collection with those in the node information which has already been stored in the node information storing apparatus 231, that is, compares each element of a plurality of node information.

(B-2) Operation of the Second Embodiment

The operation concerned with the node information will now be described with reference to the drawings with respect to the node information management system and the nodes according to the second embodiment.

The operation in each node 2*i*, particularly, the operation in the node information managing unit 220 will now be described with reference to a flowchart of FIG. 11.

In a manner similar to that described in step S11 in the foregoing first embodiment, when the node information managing unit 220 is activated, for example, whether the end of the node itself has been instructed like a shut-down process of the relevant node or not is discriminated (step S21). If it is decided that the end has been instructed, the processing routine is finished.

If the end is not instructed, the node information managing unit 220 waits for the reception of new node information from the node information forming unit 221 or the reception of the node information as backup information from the adjacent node (step S22, S23).

As will be explained hereinlater, when the node information to be backed up is supplied from the adjacent node, each node 2*i* transfers the node information to the other adjacent nodes excluding such an adjacent node for the purpose of executing a further backup process. Thus, in each node, there is a possibility that the backup information of the same contents is supplied from each different adjacent node.

Therefore, when the node information to be backed up is sent from the adjacent node, the node information managing unit 220 of each node discriminates whether the node information has already been stored in the memory device unit 222 or not (step S24). If YES, the node information managing unit 220 is returned to a wait reception mode of the new node information from the node information forming unit 221 or the backup information from the adjacent node. A discrimination about the coincidence of the node information can be made, for example, on the basis of the date/time when the node information has been obtained and formed and the ID information allocated to each node.

When the node information is sent from the node information forming unit 221 (YES in step S22) or when the new node information to be backed up is supplied from the adjacent node for the first time (YES in step S23), the node information managing unit 220 discriminates whether an empty area which can store the node information exists in the memory device unit 222 or not (step S25).

If it is determined that the empty area exists in the memory device unit 222, the node information managing unit 220 allows the memory device unit 222 to store the node information (step S26) and transmits the node information to the adjacent nodes excluding the adjacent node which transmitted the node information (step S27). After that, the node information managing unit 220 is returned to the wait reception mode of the node information from the node information forming unit 221 or the backup information from the adjacent node.

When the node information is transmitted to the adjacent nodes, "the number of hopping times" in the node information is incremented by "1" and the resultant node information is transmitted. For example, when the node information received as backup information from the adjacent node is further transferred to the other adjacent nodes, since the total number of links N1*a* through which the node information is transmitted is equal to 2, the number of hopping times is equal to 2.

The node information from the node information forming unit 221, that is, the node information formed by the node itself is transmitted to all of the adjacent nodes directly connected to the relevant node through the link N1*a*.

If it is decided in step S25 that the empty area which can store the node information supplied from the node information forming unit 221 or the new node information sent from the adjacent node does not exist in the memory device unit 222, the node information managing unit 220 compares the number of hopping times of the arrived node information with the numbers of hopping times of all of the node information which has already been stored in the memory device unit 222 (step S28) and discriminates whether the node information having the number of hopping times that is equal to or larger than the number of hopping times of the arrived node information exists in the node information which has already been stored or not (step S29).

If it is determined that the node information having the number of hopping times that is equal to or larger than the number of hopping times of the arrived node information does not exist in the node information which has already been stored, as will be explained hereinlater, the node information managing unit 220 abandons the storage of the node information, that is, abandons the node information and is returned to a wait reception mode of the node information from the node information forming unit 121 or the node information from the adjacent nodes.

Since the node information supplied from the node information forming unit 121 is the node information formed by the node itself, the number of hopping times of this information is equal to the initial value "0". On the other hand, since the node information supplied as backup information from the adjacent node is obtained via one or more nodes, the number of hopping times is equal to "1" or more. As the number of nodes through which the node information passed is larger, this node information has the larger number of hopping times.

Consequently, when the number of hopping times of the arrived node information exceeds the number of hopping times of the node information which has already been stored, it is regarded that the arrived node information had already been effectively backed up in one of the nodes through which the node information passed. It is considered that even if such node information is disused, the backup function in the system will not be lost.

If it is determined in step S29 that the node information having the number of hopping times that is equal to or larger than the number of hopping times of the arrived node information exists in the node information which has already been stored, the node information managing unit 220 searches the node information in which the number of hopping times is largest and the number of adjacent nodes of the node which formed such node information is largest and deletes the searched node information from the memory device unit 222 (step S30).

Thus, a memory area of the node information to be stored at present can be assured in the memory device unit 222. The node information managing unit 220 allows the memory device unit 222 to store the node information (step S26) and, subsequently, transmits the node information to all of the adjacent nodes excluding the adjacent node which transmitted such node information (step S27). After that, the node information managing unit 220 is returned to a wait reception mode of the node information from the node information forming unit 221 or the node information from the adjacent node.

As mentioned above, as the number of hopping times of the node information is larger, the number of nodes through which the node information passed is larger. It is considered that a possibility that the other nodes which received the node information have already backed up is very high.

As the number of nodes adjacent to the node on the side which formed the node information is larger, a possibility that the node information has already been backed up by one or more of the adjacent nodes is very high. That is, even if the node information is deleted from such a node, the backup function of the whole system is not lost.

Figure 11:
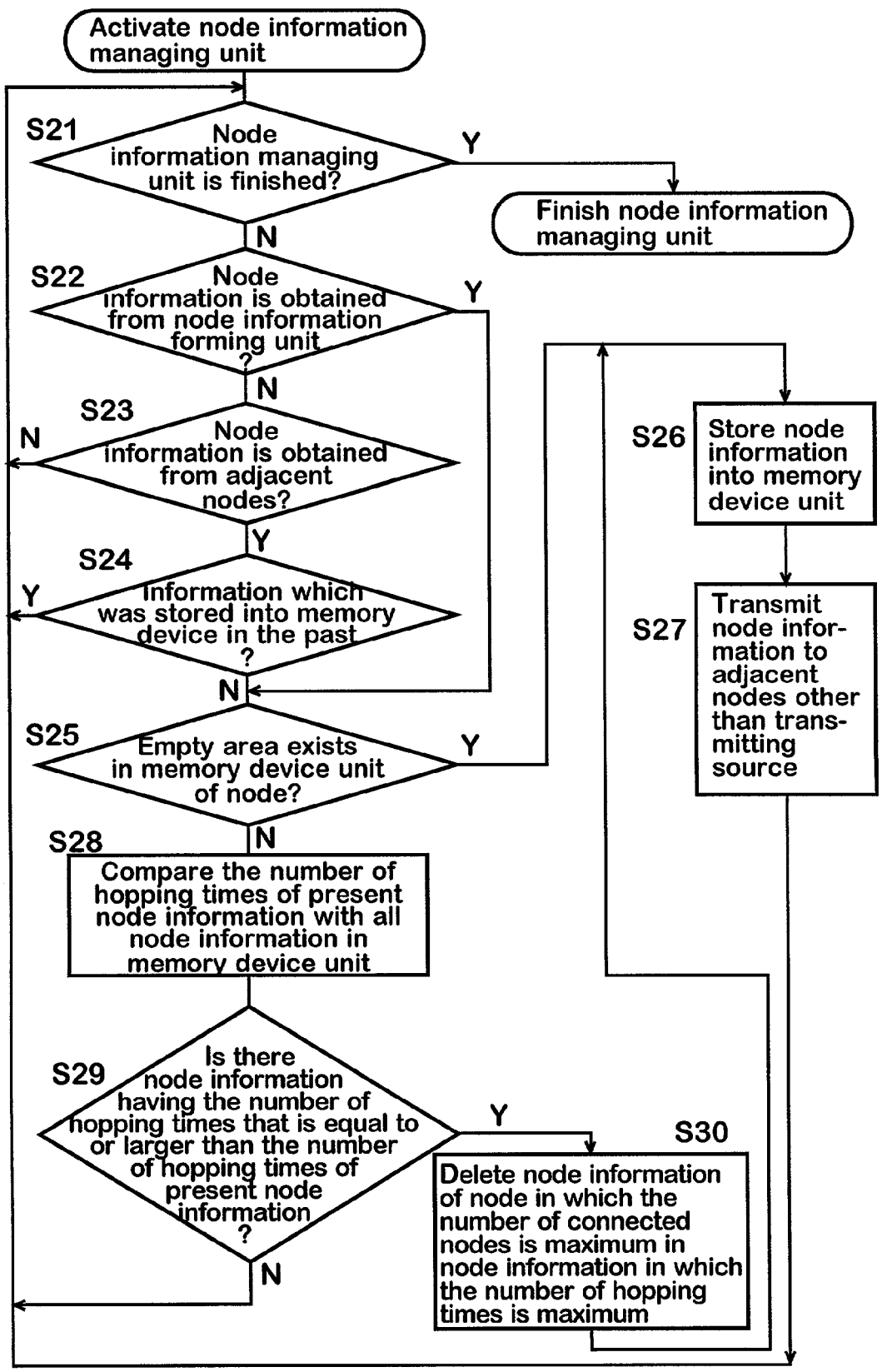
FIG. 11 is a flowchart showing processes in the node in the second embodiment.

Although not shown in the flowchart of FIG. 11, when the collecting instruction of the node information is issued from the NMS 30, the node information managing unit 220 transmits all of the node information including the backup node information stored in the memory device unit 222 to the NMS 30.

Each of FIGS. 12 to 15 is an explanatory diagram for explaining a backup procedure of the node information according to the second embodiment. As an example of the procedure, a procedure by which the node information formed by the node information forming unit 221 of the node 26 in the network N2 is stored as a backup into the other nodes is shown.

Figure 12:
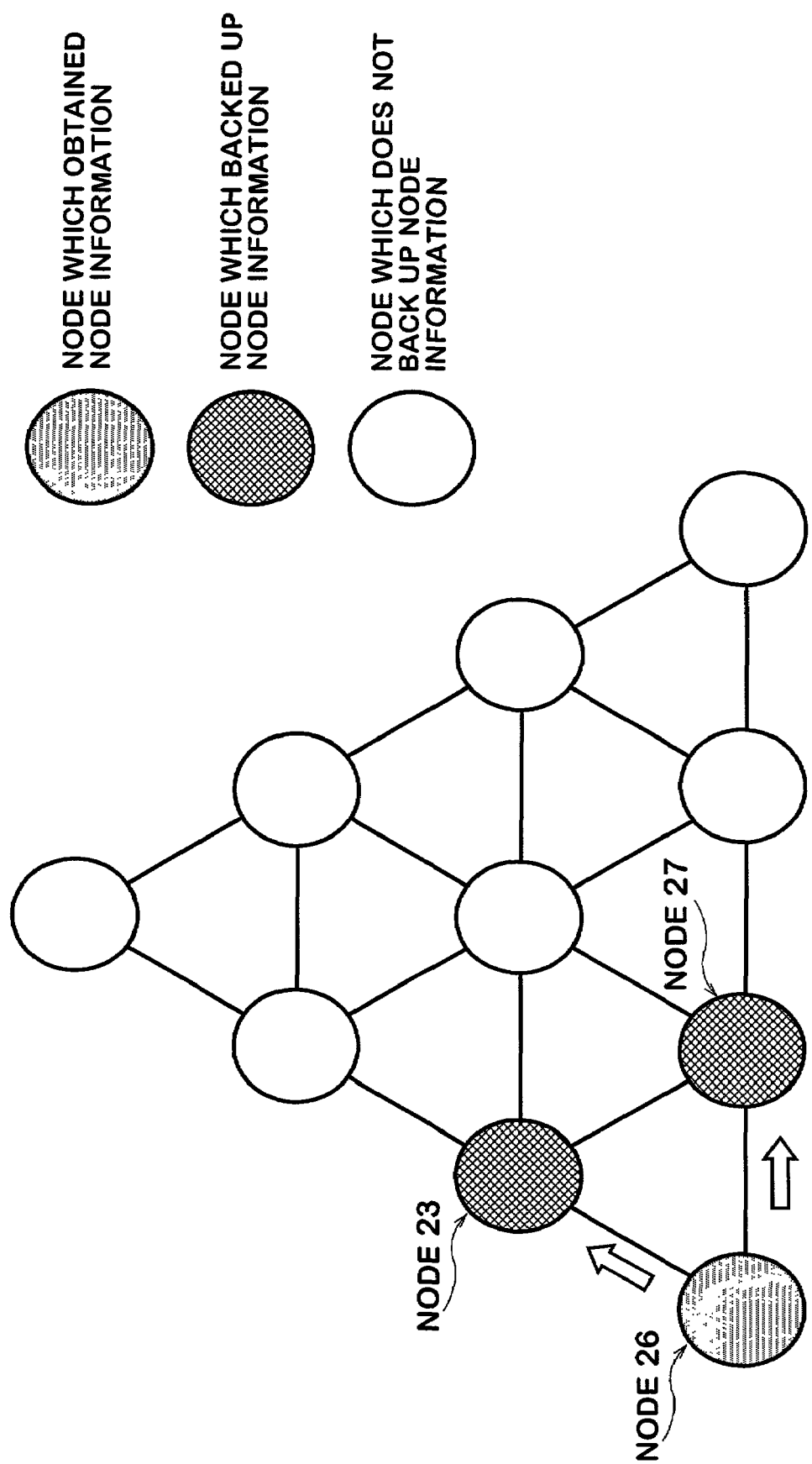
FIG. 12 is an explanatory diagram (1) of backup nodes of node information in the second embodiment.

As shown in FIG. 12, when the node information is formed by the node 26, the node information is stored into the memory device unit 222 of the node 26 (step S26 in FIG. 11) and transmitted to the nodes 23 and 27 as adjacent nodes (step S27 in FIG. 11). The number of hopping times of the node information upon transmission is equal to "1". Each of the nodes 23 and 27 as adjacent nodes receives the node information and stores it as a backup (step S26 in FIG. 11).

Figure 13:
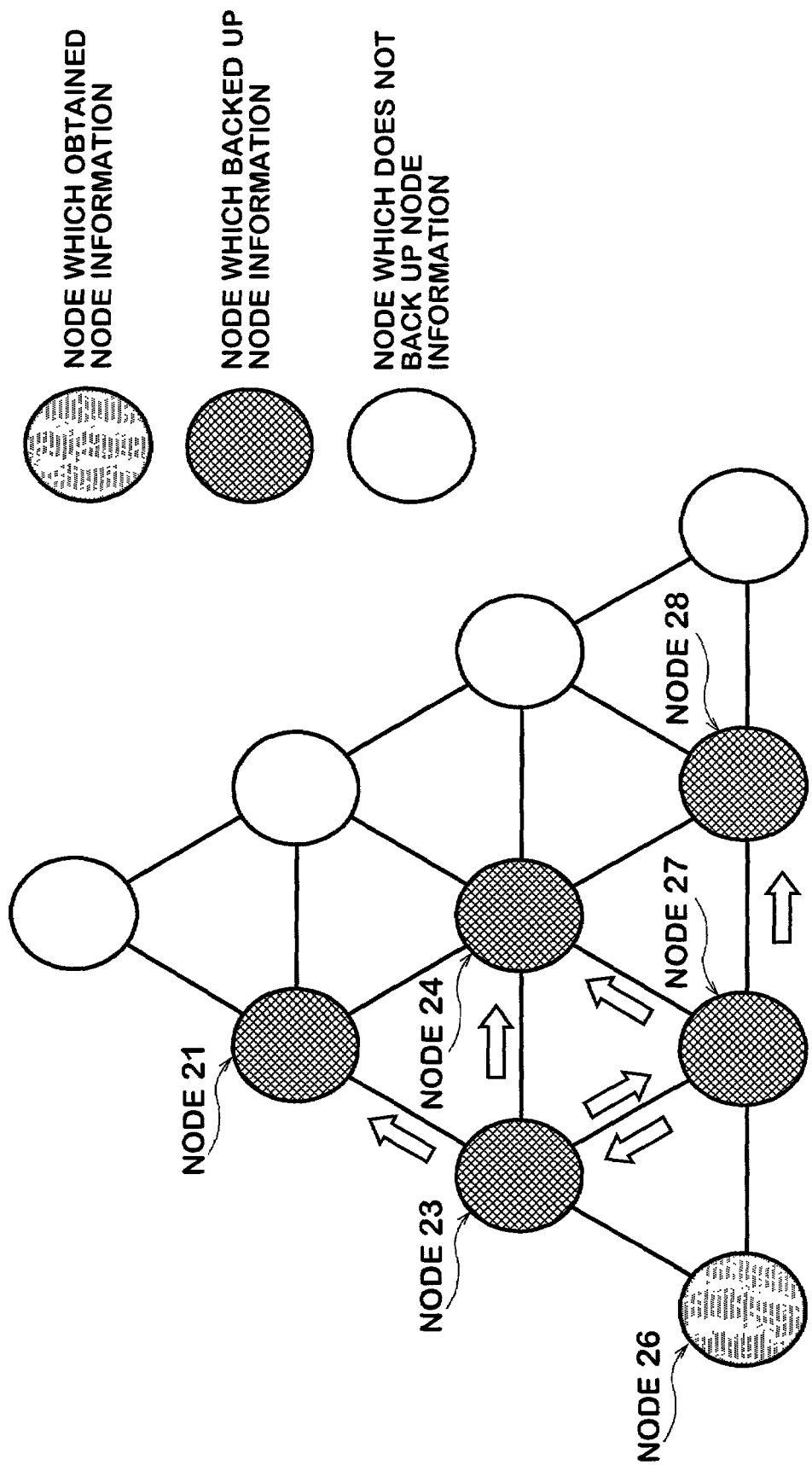
FIG. 13 is an explanatory diagram (2) of backup nodes of the node information in the second embodiment.

After that, as shown in FIG. 13, each of the nodes 23 and 27 transmits the node information from the node 26 to all of the adjacent nodes except for the node 26 as a node on the transmitting source side (step S27 in FIG. 11). The number of hopping times of the node information upon transmission is equal to "2".

Thus, the node information is supplied to the nodes 21, 24, and 28 and stored as a backup.

As shown in FIG. 13, although the nodes 23 and 27 mutually receive the node information showing the same contents again, since this node information has been received once in the past, it is not stored in the memory device unit 222 again (step S24 in FIG. 11).

Figure 14:
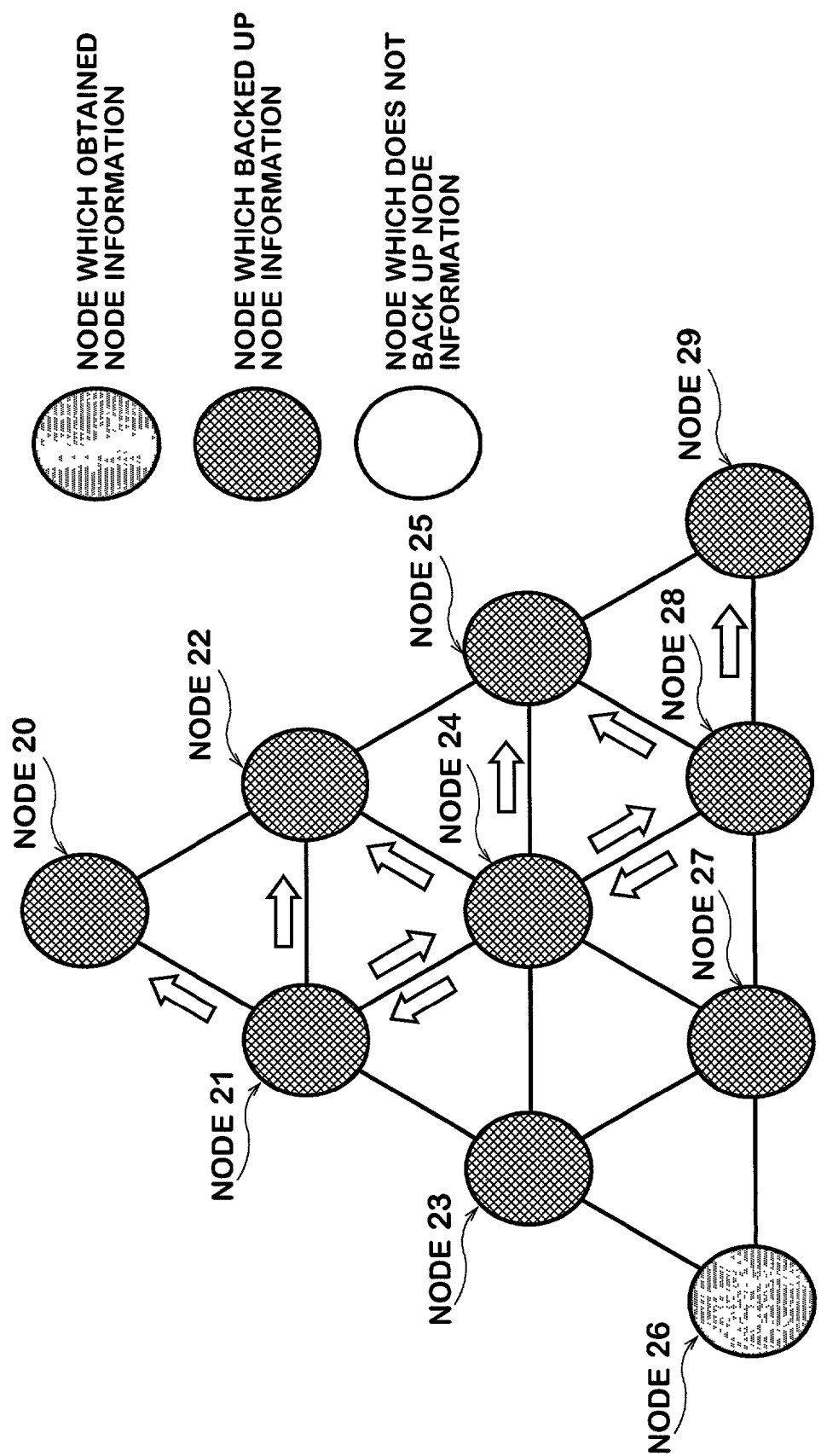
FIG. 14 is an explanatory diagram (3) of backup nodes of the node information in the second embodiment.

As shown in FIG. 14, each of the nodes 21, 24, and 28 transmits the node information to all of the adjacent nodes except for the node on the transmitting source side. By the backup transfer of the node information as mentioned above, the node information as backup information is supplied at least once to all of the nodes except for the node 26 which formed the node information and the node information is stored as a backup into all of the other nodes.

It is now assumed that the empty area to store the backup information does not exist in the memory device units 222 of the nodes 22 and 28. In this case, the processes in steps S28 to S30 in FIG. 11 mentioned above are executed in the nodes 22 and 28.

Figure 15:
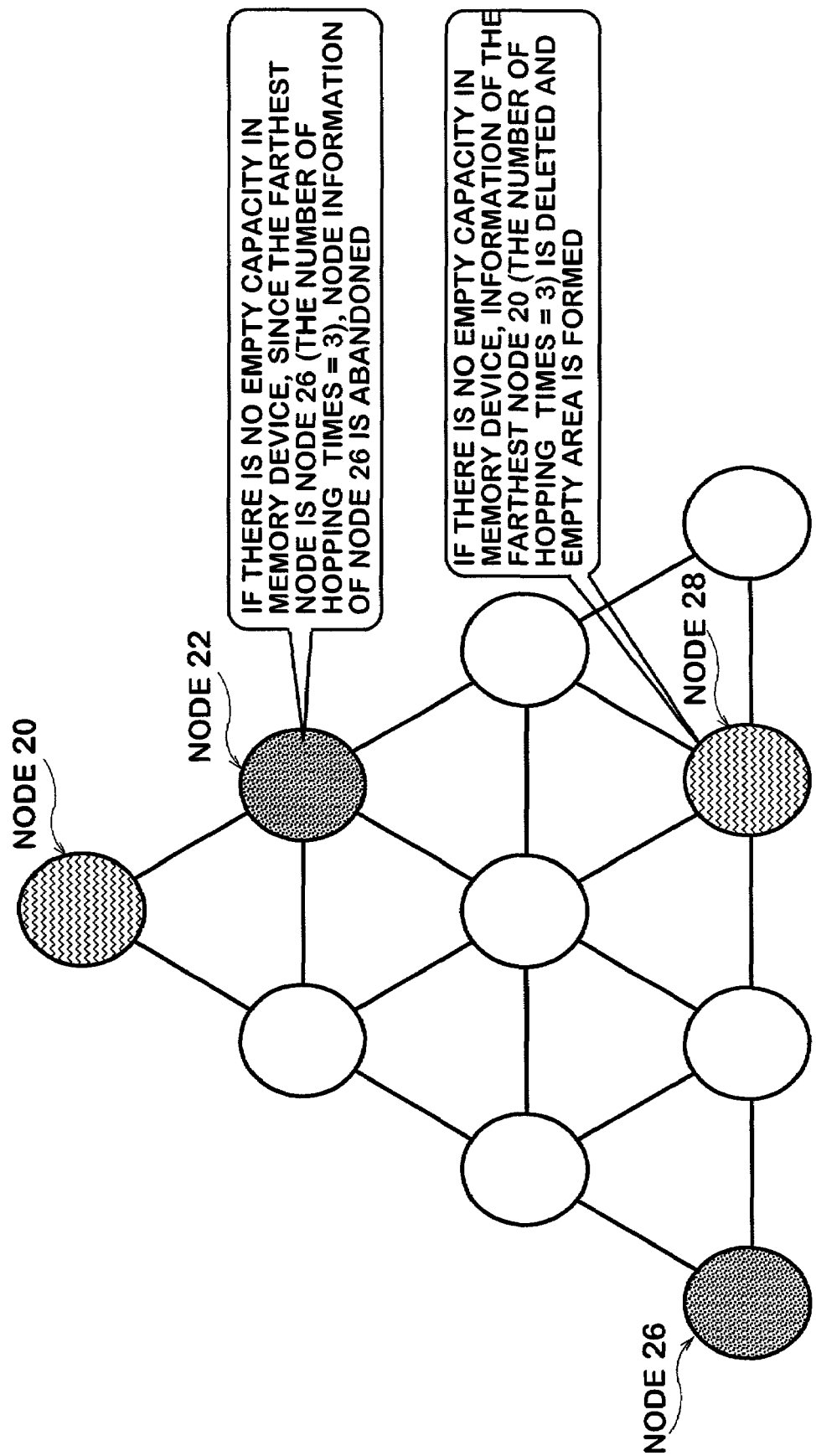
FIG. 15 is an explanatory diagram (4) of backup nodes of the node information in the second embodiment.

As shown in FIG. 15, it is considered that the node 26 is the farthest node (the number of passing nodes is largest) when it is seen from the node 22. Therefore, by the process in step S29 in FIG. 11, the node 22 determines that the number of hopping times of the node information from the node 26 is largest, so that the node 22 abandons this node information.

When the node information from the node 26 is supplied for the first time, by the process in step S30 in FIG. 11, the node 28 forms an empty area by deleting the node information (the number of hopping times is equal to 3) of the node 20 which is farthest from the node 28 itself from the memory device units 222 and stores the node information of the node 26 into the empty area as shown in FIG. 15.

As mentioned above, each node preferentially stores, as a backup, the node information of the near node, that is, the node information in which the number of hopping times is small.

The node information collecting process which is executed by the node information collecting unit 230 and node information comparing function unit 232 of the NMS 30 will now be described with reference to a flowchart of FIG. 16.

Figure 16:
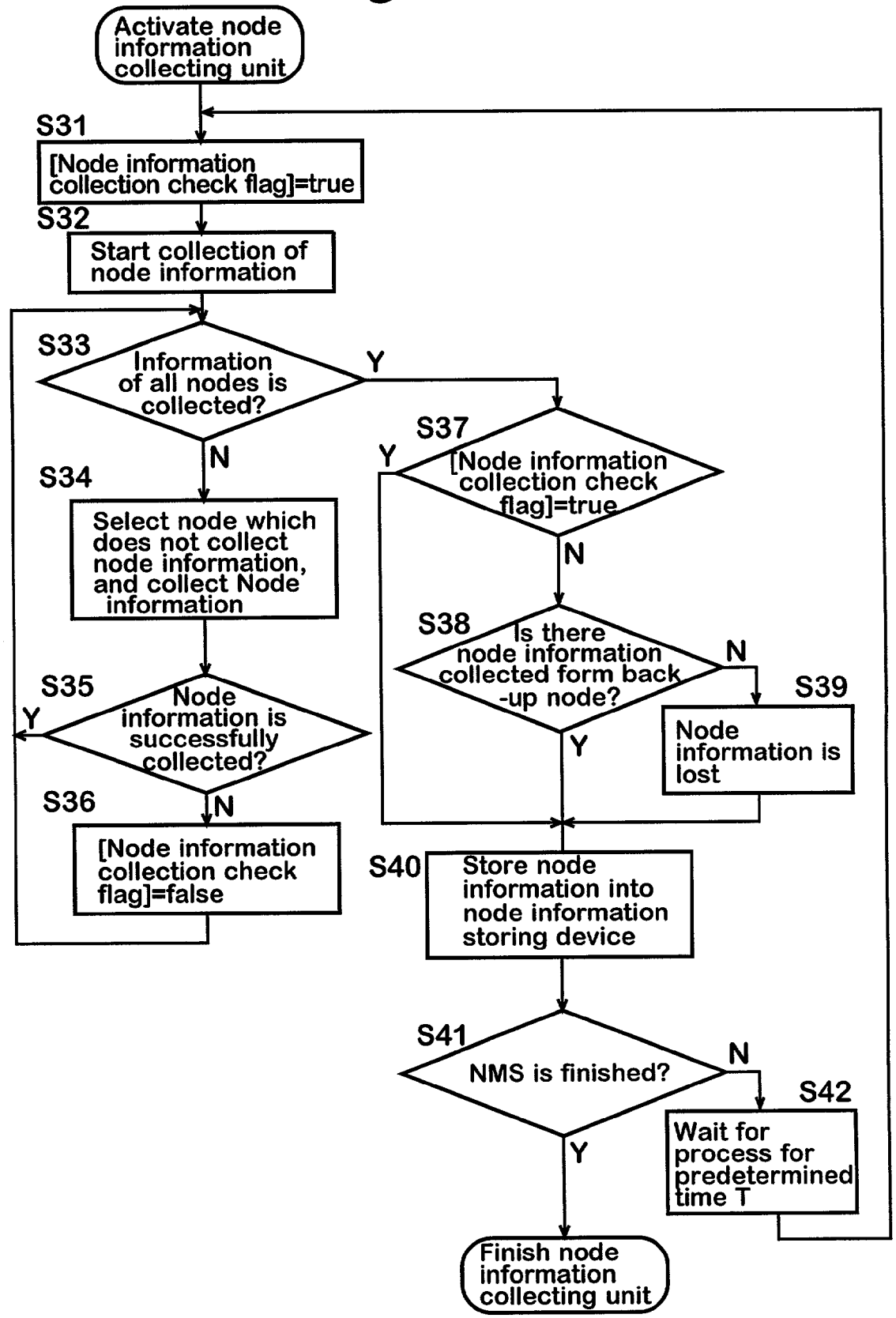
FIG. 16 is a flowchart showing a collecting process of the NMS in the second embodiment.

In FIG. 16, processes in steps S31 to S36 are executed by the node information collecting unit 230 and processes in steps S37 to S42 are executed by the node information comparing function unit 232, respectively.

When the node information collecting unit 230 of the NMS 30 is activated, the collecting unit 230 sets a node information collection check flag to "true" (step S31) and starts the node information collecting process (step S32). The node information collection check flag is used for discriminating whether the node information could normally be collected or not. "true" shows that the node information could successfully be collected with respect to all of the nodes. "false" shows that the node from which the node information could not be collected exists.

After that, while confirming whether the collecting process of the node information obtained and formed by the node has been executed or not with respect to all of the nodes (step S33), the node information collecting unit 230 repeats the collecting process of the node information every node (steps S33 to S36).

The node information collecting unit 230 selects one node to which the collection of the node information is not activated yet, and allows this node to transmit the node information to the NMS 30 (step S34), and discriminates whether the node information could be selected or not (step S35). The node to which the transmission of the node information was instructed in step S34 transmits all of the node information of the node itself and the other nodes stored in the memory device unit 222 of the node itself. Although not shown in the flowchart of FIG. 16, the node information collecting unit 230 of the NMS 30 transfers the collected node information to the node information comparing function unit 232.

If the node information could successfully be collected (YES in step S35), the node information collecting unit 230 is returned to step S33 mentioned above and executes the process for discriminating whether the node information of all of the nodes were collected or not.

If the node information cannot be collected from the node from which it is intended to collect the node information (NO in step S35), the node information collecting unit 230 determined that an abnormality occurred in the node. Thus, the node information collection check flag is set to "false" (step S36) and the collecting unit 230 is returned to the process for discriminating whether the collecting process of the node information obtained (formed) by the node has been executed or not with respect to all of the nodes in step S33 mentioned above.

After the collection of all of the node information stored in all of the nodes was tried (YES in step S33) by repeating the processes as mentioned above, the node information comparing function unit 232 discriminates whether all of the stored node information has successfully been collected from all nodes or not on the basis of the contents of the node information collection check flag (step S37).

If the node which failed in collection of the node information exists, the node information comparing function unit 232 discriminates whether the backup information has been obtained or not (step S38). For example, the node information comparing function unit 232 compares ID information (IP address) of the obtaining node included in the node information collected from the other nodes except for the failed node with the ID information of the node which failed in the collection of the node information. If there is a node in which both of the ID information coincide, it is determined that the backup information could be obtained.

If the node having no backup information exists among the other nodes, the node information comparing function unit 232 allows the node information storing apparatus 231 to store a message indicative of the loss of the node information with respect to such a node (step S39).

In the case where all of the stored node information has successfully been collected from all of the nodes (YES in step S37), in the case where the presence of the backup node information was recognized although a part of the nodes failed in the collection (YES in step S38), after the loss of the node information was stored (step S39), or the like, the node information comparing function unit 232 of the NMS 30 determines that the node information whose obtaining node and the date/time mutually coincide among the node information supplied to the NMS 30 is the same node information. Such overlapped node information is collectively stored into the node information storing apparatus 231 (step S40).

After that, the node information comparing function unit 232 discriminates whether the NMS 30 has been inactivated (finished) or not, that is, whether the NMS 30 has executed the shut-down process or not (step S41).

If NO, the node information comparing function unit 232 executes a counting process of the predetermined time T which specifies a start time point of the next polling collection by a predetermined timer (step S42). When the counting operation of the predetermined time T is finished, the processing routine is returned to step S31, thereby restarting the collection of the node information.

When the NMS 30 is inactivated, the node information collecting unit 230 or the like finishes its own process.

(B-3) Effects of the Second Embodiment

According to the node information management system and the nodes of the second embodiment according to the invention, the following effects are obtained.

Even in the case where a failure occurs in one or a plurality of nodes and the node information cannot be read out, the backup node information can be read out from another node by the processes according to the flowchart of FIG. 16 mentioned above, so that a possibility of the loss of the node information is very low.

Since a failure resistance in the management of the node information is improved, the polling time interval (T) of collecting the node information of the NMS can be set to a long time interval, and the load of the processes of the NMS can be reduced.

Further, since all of the nodes in which the node information should be backed up are the other nodes, so long as a memory capacity in each node is permitted, a possibility that the node information is lost can be set to an extremely low value.

In the second embodiment as mentioned above, although one node information is intended to be backed up into all of the nodes, as mentioned above, each node automatically and preferentially stores the node information existing in the near node in consideration of the empty capacity of the memory device unit in the node. Therefore, the node information can be efficiently backed up as a whole system.

Moreover, the node information management system and the nodes in the second embodiment can be also applied to any network construction such as mesh-shaped construction, ring-shaped construction, bus-shaped construction, or the like, can easily cope with addition or deletion of the nodes, and have excellent flexibility.

(C) Third Embodiment

The third embodiment of a node information management system and nodes according to the invention will now be described with reference to the drawings.

In the foregoing first and second embodiments, the construction of the network is not limited. However, the third embodiment is applied to a ring-shaped network.

(C-1) Construction of the Third Embodiment

Figure 17:
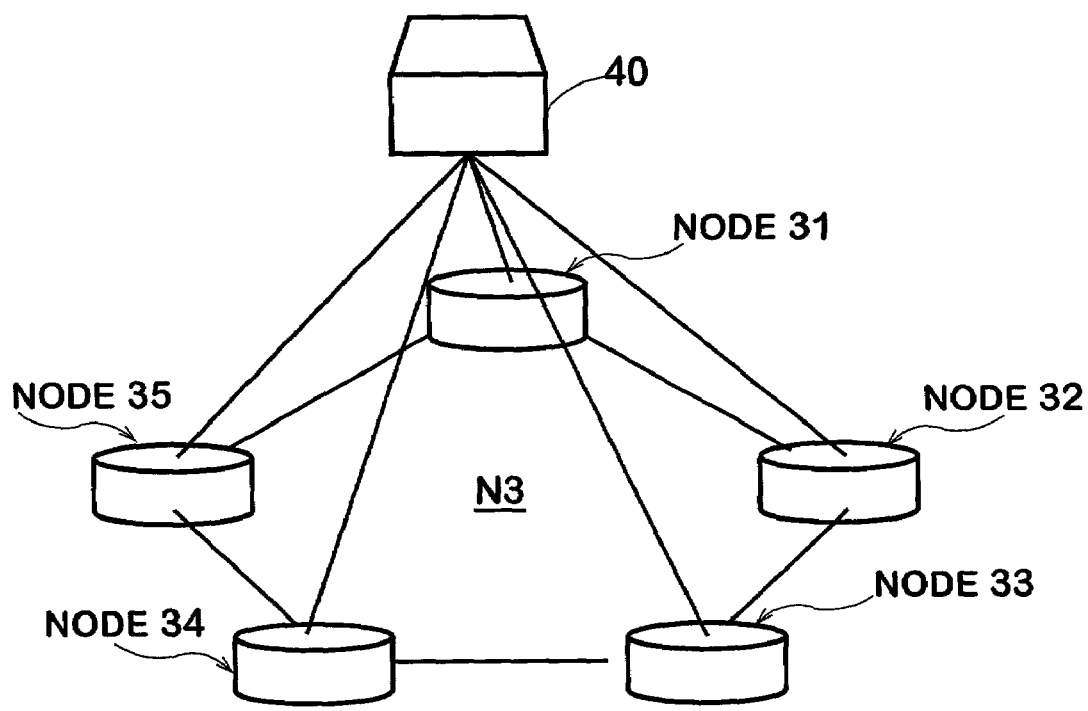
FIG. 17 is a block diagram showing a construction of a network according to the third embodiment.

FIG. 17 is a block diagram showing a construction of a packet exchange network of the third embodiment. As shown in FIG. 17, a network N3 has: a plurality of nodes 31 to 35 connected like a ring through a link N3a; and an NMS 40 as a monitoring apparatus. In an example shown in the diagram, five nodes are connected to the network N3.

In the third embodiment, a construction of node information which is obtained by each of the nodes 31 to 35 can be also shown by FIG. 3 regarding the first embodiment mentioned above.

Figure 18:
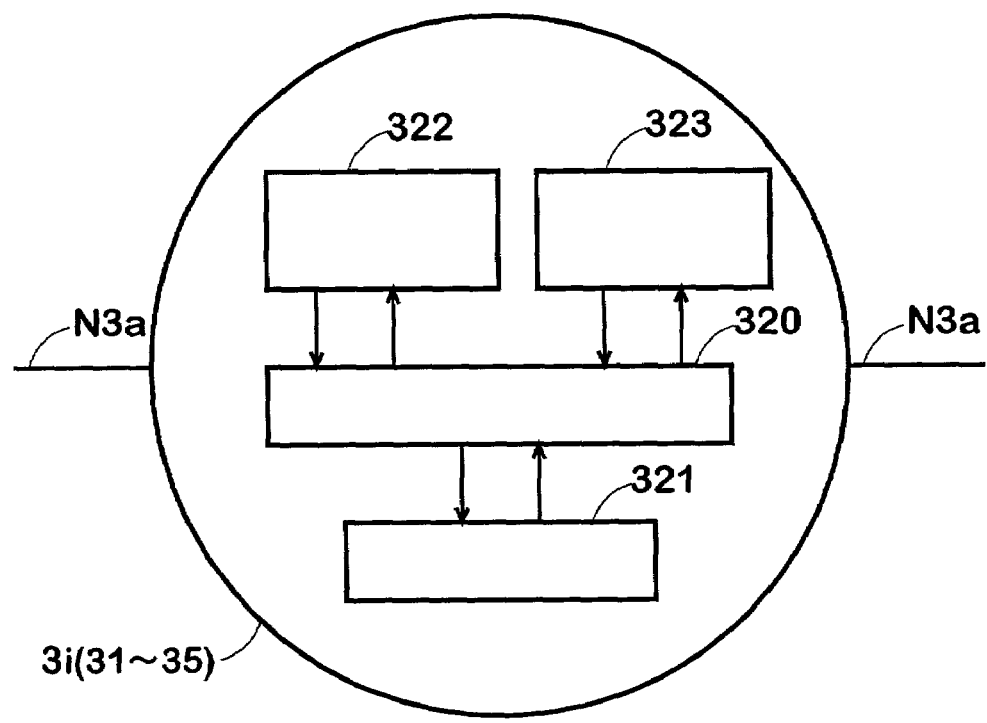
FIG. 18 is a block diagram showing a construction of a node according to the third embodiment.

FIG. 18 is a block diagram showing a functional construction of a main section of each of the nodes 31 to 35 of the third embodiment.

As shown in FIG. 18, each node 3i (3i is one of 31 to 35) has: a node information managing unit 320; a node information forming unit 321; a memory device unit 322; and another node information memory device unit 323.

The node information managing unit 320 executes a storing process of node information obtained and formed by the node information forming unit 321 and node information transferred from other nodes, a transferring process of the node information to the backup nodes and the NMS 40, and the like.

The node information forming unit 321 monitors a traffic amount of the nodes 3i, a rate of packet loss, a delay of the packet, charge information per user, and the like, properly forms the node information by using those information, and sends the formed node information to the node information managing unit 320.

The memory device unit 322 stores the node information of the nodes 3i under the control of the node information managing unit 320.

The another node information memory device unit 323 stores the node information as backup information sent from the adjacent node under the control of the node information managing unit 320.

A functional construction of the NMS 40 is similar to that of the NMS 10 in the first embodiment shown in FIG. 4. In the third embodiment, ID information of another node locating in the clockwise direction of each node in FIG. 17 is registered into the backup node management table 132. For example, the node 32 is registered as a backup node of the node 31. In place of the above method, another node locating in the counterclockwise direction of each node in FIG. 17 can be also set to another node which should be registered into the backup node management table 132.

(C-2) Operation of the Third Embodiment

The operation concerned with the node information will now be described with reference to the drawings with respect to the node information management system aid the nodes according to the third embodiment.

The operation in each node 3i, particularly, the operation in the node information managing unit 320 of each node will now be described with reference to a flowchart of FIG. 19.

When processes of the node information managing unit 320 are activated, the unit 320 discriminates whether the relevant node has executed a shut-down process or not, in other words, whether the end of the node itself has been instructed or not (step S51). If it is decided that the end has been instructed, the processing routine is finished.

If the end is not instructed, the node information managing unit 320 waits for the reception of the node information from the node information forming unit 321 or the reception of the node information from the adjacent node locating in the counterclockwise direction (step S52, S53).

When the node information of the node itself is supplied from the node information forming unit 321, the node information managing unit 320 sends the node information to the memory device unit 322, thereby allowing the memory device unit 322 to store the node information (step S54). After that, the node information managing unit 320 sends the node information of the node itself as backup node information only to the adjacent node locating in the clockwise direction (step S55) and is returned to a wait reception mode of the node information from the node information forming unit 321 or the node information from the adjacent nodes.

When the node information as backup node information is sent from the adjacent node locating in the counterclockwise direction, the node information managing unit 320 transfers the node information to the another node information memory device unit 323 locating in the clockwise direction, thereby allowing the memory device unit 323 to store the backup information (step S56). After that, the node information managing unit 320 is returned to a wait reception mode of new node information from the node information forming unit 321 or the node information from the adjacent nodes.

Figure 19:
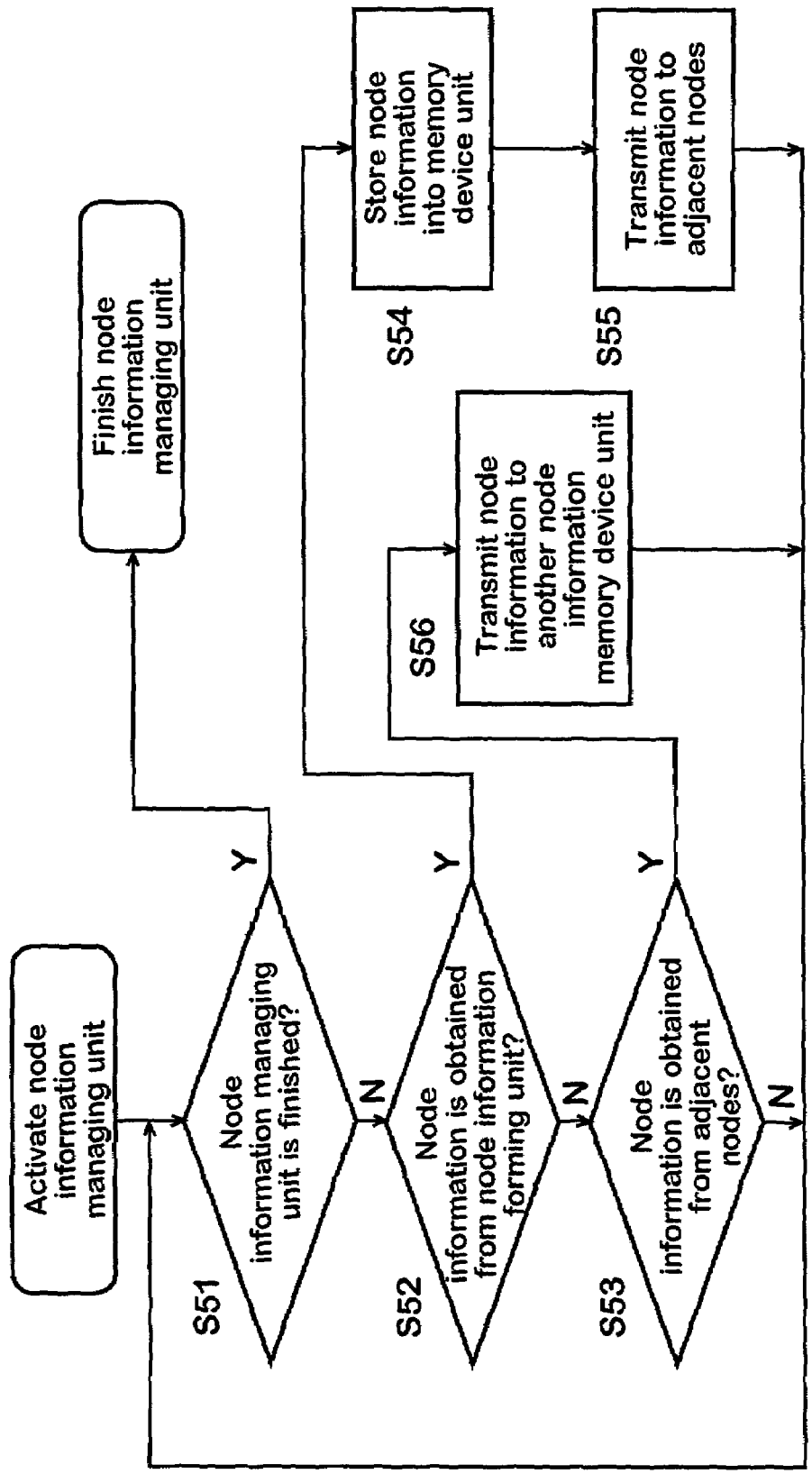
FIG. 19 is a flowchart showing processes in the node in the third embodiment.

Although not shown in the flowchart of FIG. 19, when the collecting instruction of the node information is issued from the NMS 40, the node information managing unit 320 of each node transmits the node information stored in the memory device unit 322 to the NMS 40. When the collecting instruction of the node information of another node, that is, the backup information is issued from the NMS 40, the node information managing unit 320 transmits the corresponding node information among the node information stored in the another node information memory device unit 323 to the NMS 40.

As mentioned above, in the third embodiment, the adjacent node locating in the clockwise direction of each node stores the node information as a backup.

FIG. 20 is an explanatory diagram for explaining an example of a backup process in the third embodiment and shows a procedure by which the node information obtained and formed by the node information forming unit 321 of the node 31 is stored into the adjacent node as a backup.

When the node information of the node 31 is stored as a backup, the adjacent node into which the node information should be backed up is the node 32 which is neighboring clockwise as shown in FIG. 20. By the process in step S55 in FIG. 19 mentioned above, the node 31 transmits the node information for backup to the adjacent node 32. The node 32 stores the received node information of the node 31 into the another node information memory device unit 323 by the process in step S56 in FIG. 19 mentioned above.

Similarly, the nodes which should back up the node information of each of the nodes 32, 33, 34, and 35 transmits the backup information to the nodes 33, 34, 35, and 31 which are neighboring clockwise.

Since a node information collecting method which is executed by the NMS 40 in the third embodiment is similar to that in the first embodiment, its explanation is omitted here.

(C-3) Effects of the Third Embodiment

According to the node information management system and the nodes of the third embodiment of the invention, the following effects can be obtained.

Even in the case where a failure occurs in one or a plurality of nodes and the node information cannot be read out, since the backup node information can be read out, a possibility of the loss of the node information is very low.

Since a failure resistance in the management of the node information is improved, the polling time interval of collecting the node information of the NMS can be set to a long time interval, and the load of the processes of the NMS can be reduced.

Further, since each node merely stores the node information of the node itself and the node information locating in the counterclockwise direction, a memory device of a large scale is unnecessary. It is sufficient to transmit the backup node information only to one adjacent node and the transmitting process is easy.

(D) Other Embodiments

Although the polling method has been shown as a collecting method of the node information by the NMS in each of the embodiments, another collecting method can be used. For example, an active program method can be also used. Also in this case, according to the invention, the failure resistance can be improved and a transmitting period of a programmable packet for collecting in the NMS can be set to a period longer than the conventional one.

According to the invention, fundamentally, the node information collecting method by the NMS is not limited. However, in order to effectively embody the invention, it is desirable to use a collecting method such that the NMS can detect a failure in each node, for example, like the foregoing polling method.

The node information as a collection target is not limited to that shown in FIG. 3. Various elements such as occupation band, connecting time of the user, charge for the user, and the like can be also included in accordance with the function of the node.

In the first embodiment, the nodes adjacent to the node which obtained and formed the node information have been set to the backup nodes. In the second embodiment, all of the nodes except for the node which obtained and formed the node information have been set to the backup nodes. However, the nodes locating at the positions which are away from the obtaining node by almost the intermediate number between both of those numbers of nodes can be also used as backup nodes. That is, for example, the nodes locating at the positions corresponding to the second hopping time from the node which obtained and formed the node information can be also used as backup nodes. With respect to the third embodiment as well, in a manner similar to that mentioned above, the nodes locating at the positions which are away from the node which obtained and formed the node information by a predetermined number of hopping times can be also used as backup nodes.

Although the example in which the nodes which should back up the node information of each node are determined by the same logic has been shown in each of the foregoing embodiments, a range of the backup nodes can be also changed every node. For example, the backup nodes for the nodes in which the number of connected nodes is larger than a predetermined number can be set to the adjacent nodes which are located at positions corresponding to the number of hopping times of "1" and to which the node information can be transferred, and the backup nodes for the nodes in which the number of connected nodes is equal to or less than a predetermined number can be also set to other nodes which are located at positions corresponding to the number of hopping times of "2" and to which the node information can be transferred. Each node can also have the backup node management table provided for the NMS in the embodiments, thereby enabling other arbitrary nodes to be set to the backup nodes. In this case, the NMS also needs to have the backup node management table of contents similar to those of each node.

According to the invention, the network is not limited to the packet transfer type network.

Although the case where each node and the node information collecting apparatus (NMS) are separately provided has been shown in each of the embodiments, in place of the node information collecting apparatus, one of the nodes can also have the function of the collecting apparatus.

It is also possible to provide a selecting switch for enabling each node to select whether the node information is transmitted to the backup nodes or not, thereby allowing the node information to be transmitted to the backup nodes in accordance with the setting of the user or the setting by the NMS.

According to the invention, since the node information formed by each node in the network has been stored as a backup into other nodes in the network, a possibility that the node information is lost can be reduced even when a failure occurs in the node. Moreover, the load of the collecting process of the node information collecting apparatus can be also reduced.

The present invention is not limited to the foregoing embodiments but many modifications and variations are possible within the spirit and scope of the appended claims of the invention.

What is claimed is:

1. A node information management system, comprising:
a plurality of nodes connected via transmission links; and
a collecting apparatus which is connected with said plurality of nodes and collects respective node information from said plurality of nodes,
wherein said plurality of nodes include first and second nodes, said second node serving as a backup node for storing first node information about said first node as first backup information,
wherein said first node comprises a first node information generating section to generate said first node information, a first node information storing section to store said first node information, and a first management section to make said first node information storing section store said first node information and to send said first node information to said second node,
wherein said second node has a first backup information storing section to store said first node information, and
wherein said collecting apparatus, if it judges that said first node information cannot be collected from said first node, collects said first node information from said second node on the basis of a correspondence relation between said first node and said second node.

2. The node information management system according to claim 1, wherein said first node functions as a backup node with respect to another node in said plurality of nodes, and further comprises another backup information storing section to store backup information about said another node in said first node.

3. The node information management system according to claim 2, wherein said first node and said another node are connected by a link that does not pass through other nodes.

4. The node information management system according to claim 2, wherein said first node and said another node are connected along a link path that passes through at least one other node.

5. The node information management system according to claim 2, wherein said another node is said second node.

6. The node information management system according to claim 1, wherein said second node comprises a second node information generating section to generate second node information about said second node, a second node information storing section to store said second node information, and a second management section to make said second node information storing section store said second node information and to send said second node information to a further node.

7. The node information management system according to claim 6, wherein said second node and said further node are connected by a link that does not pass through other nodes.

8. The node information management system according to claim 6, wherein said second node and said further node are connected along a link path that passes through at least one other node.

9. The node information management system according to claim 6, wherein said further node is said first node.

10. The node information management system according to claim 1, wherein said first and second nodes are connected by a link that does not pass through other nodes.

11. The node information management system according to claim 1, wherein said first and second nodes are connected along a link path that passes through at least one other node.

* * * * *